(12) United States Patent
Chino

(10) Patent No.: US 8,514,198 B2
(45) Date of Patent: Aug. 20, 2013

(54) ELECTRO-OPTICAL DEVICE, ELECTRONIC APPARATUS, AND CONTACT DETECTION METHOD

(75) Inventor: Taketo Chino, Hokuto (JP)

(73) Assignee: Japan Display West, Inc., Aichi-Ken (JP)

( * ) Notice: Subject to any disclaimer, the term of this patent is extended or adjusted under 35 U.S.C. 154(b) by 643 days.

(21) Appl. No.: 12/412,584

(22) Filed: Mar. 27, 2009

(65) Prior Publication Data

US 2009/0284492 A1    Nov. 19, 2009

(30) Foreign Application Priority Data

May 16, 2008    (JP) ................................. 2008-129300

(51) Int. Cl.
*G06F 3/045*    (2006.01)

(52) U.S. Cl.
USPC ......................................... 345/174; 345/173

(58) Field of Classification Search
None
See application file for complete search history.

(56) References Cited

U.S. PATENT DOCUMENTS

| | | | | |
|---|---|---|---|---|
| 5,376,947 A * | 12/1994 | Kuroda | ........................... | 345/173 |
| 6,356,309 B1 * | 3/2002 | Masaki et al. | ............. | 348/439.1 |
| 6,496,170 B1 * | 12/2002 | Yoshida et al. | ................. | 345/87 |
| 6,570,549 B2 * | 5/2003 | Nakanishi et al. | .............. | 345/87 |
| 2001/0048412 A1 * | 12/2001 | Nakanishi et al. | .............. | 345/87 |
| 2002/0154079 A1 * | 10/2002 | Shiota et al. | ..................... | 345/87 |
| 2005/0094038 A1 * | 5/2005 | Choi et al. | ........................ | 349/12 |
| 2005/0280616 A1 * | 12/2005 | Miwa et al. | ...................... | 345/77 |
| 2006/0192766 A1 * | 8/2006 | Nakamura et al. | ............ | 345/173 |
| 2007/0046639 A1 * | 3/2007 | Swedin | .......................... | 345/173 |
| 2007/0176868 A1 * | 8/2007 | Lee et al. | ......................... | 345/87 |
| 2007/0268243 A1 * | 11/2007 | Choo et al. | ..................... | 345/104 |

FOREIGN PATENT DOCUMENTS

| | | |
|---|---|---|
| JP | 06-230884 | 8/1994 |
| JP | 06-250786 | 9/1994 |
| JP | 08-030376 | 2/1996 |
| JP | 09-292950 | 11/1997 |
| JP | 11-143626 | 5/1999 |
| JP | 2006-040289 | 2/2006 |
| JP | 2007510949 | 4/2007 |

OTHER PUBLICATIONS

Japanese Office Action issued Jan. 24, 2012, for corresponding Japanese Appln. No. 2008-129300.

* cited by examiner

*Primary Examiner* — Joseph Haley
*Assistant Examiner* — Ifedayo Iluyomade
(74) *Attorney, Agent, or Firm* — K&L Gates LLP

(57) ABSTRACT

An electro-optical device is provided and includes a driving section that supplies an electric potential to a third electrode and supplies an electric potential to a fourth electrode; and a controlling section that controls the operation of writing into a first memorizing section and a second memorizing section and the operation of reading out of the first memorizing section and the second memorizing section. A contact detection method that utilizes an electro-optical device is also provided.

10 Claims, 20 Drawing Sheets

V REVERSE METHOD

V REVERSE METHOD

INITIALIZATION PROCESSING

TOUCH-JUDGMENT PROCESSING

INITIALIZATION PROCESSING

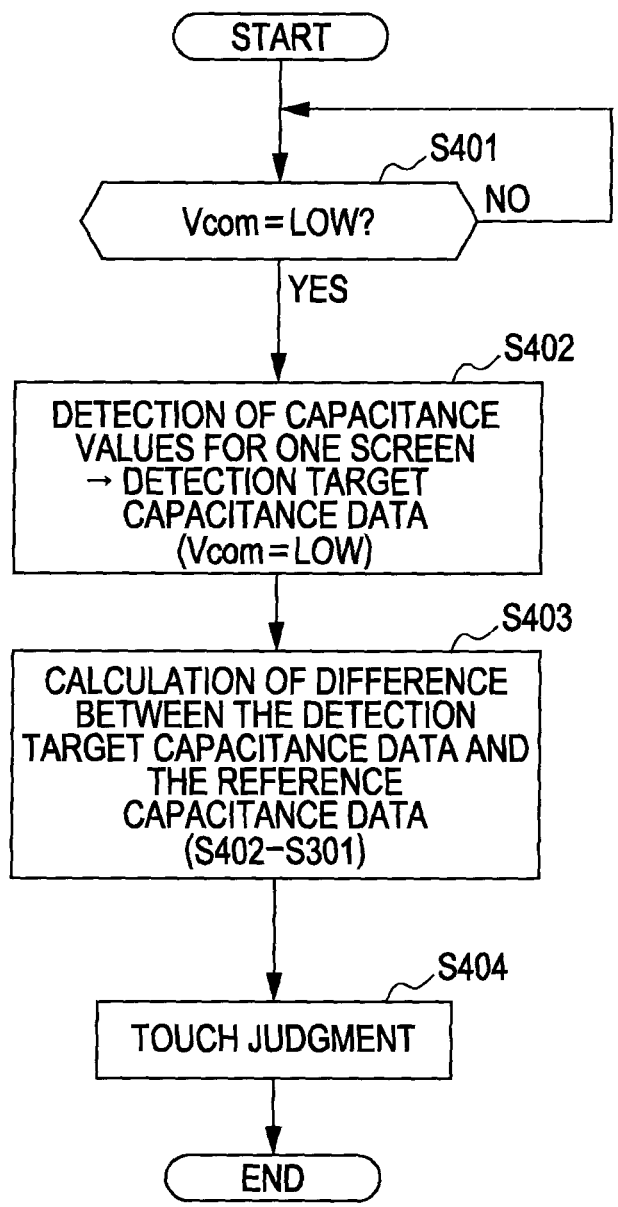

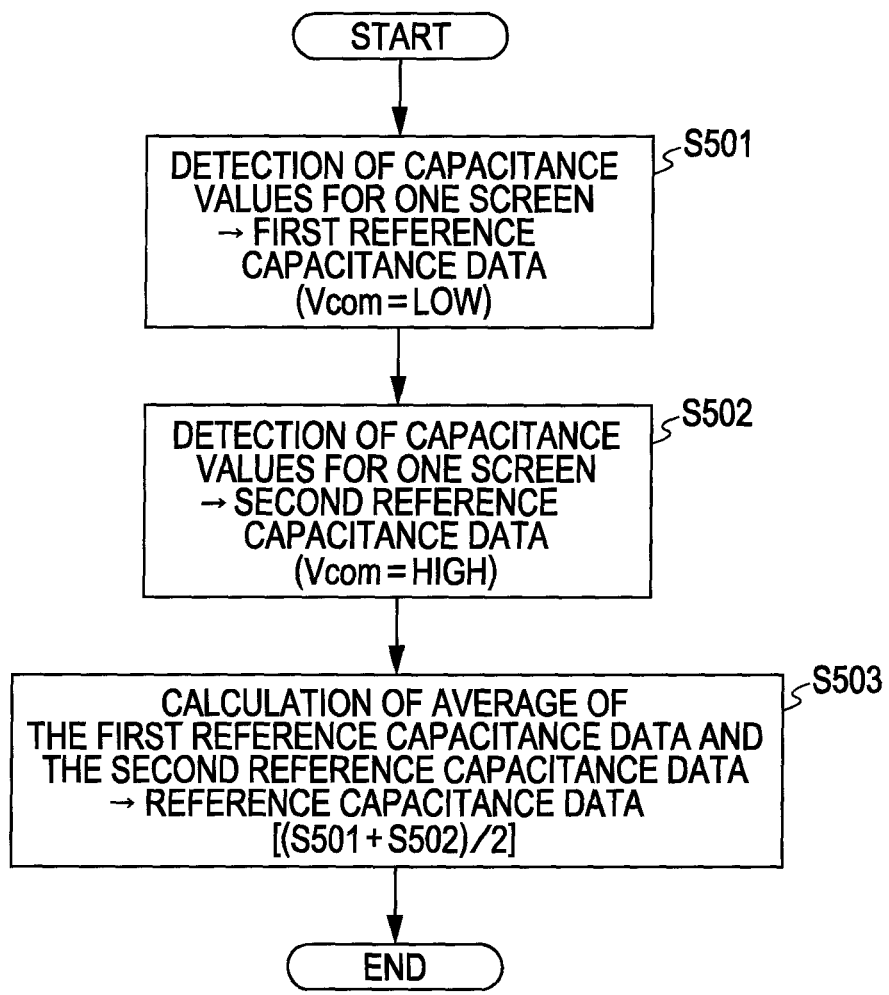

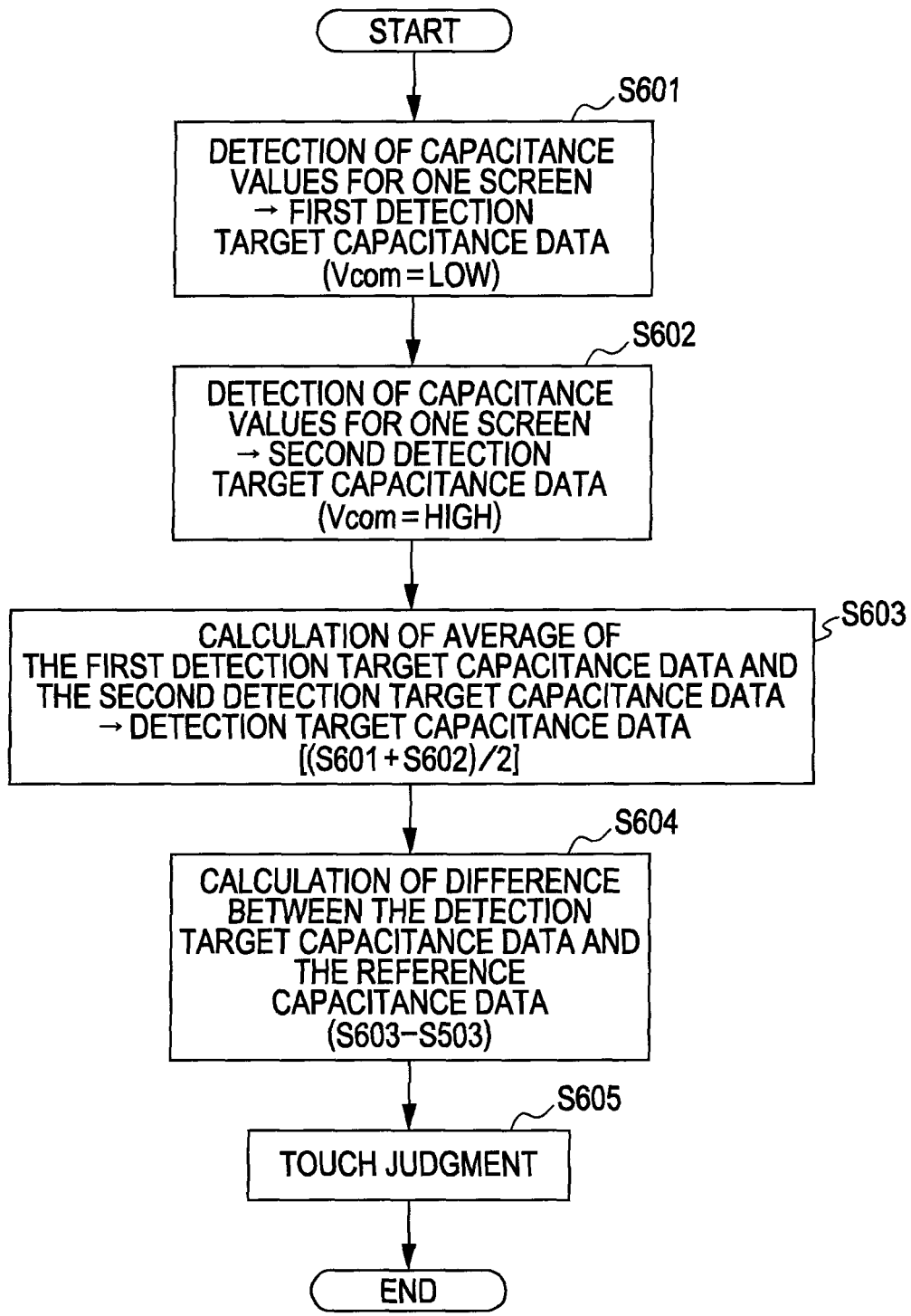

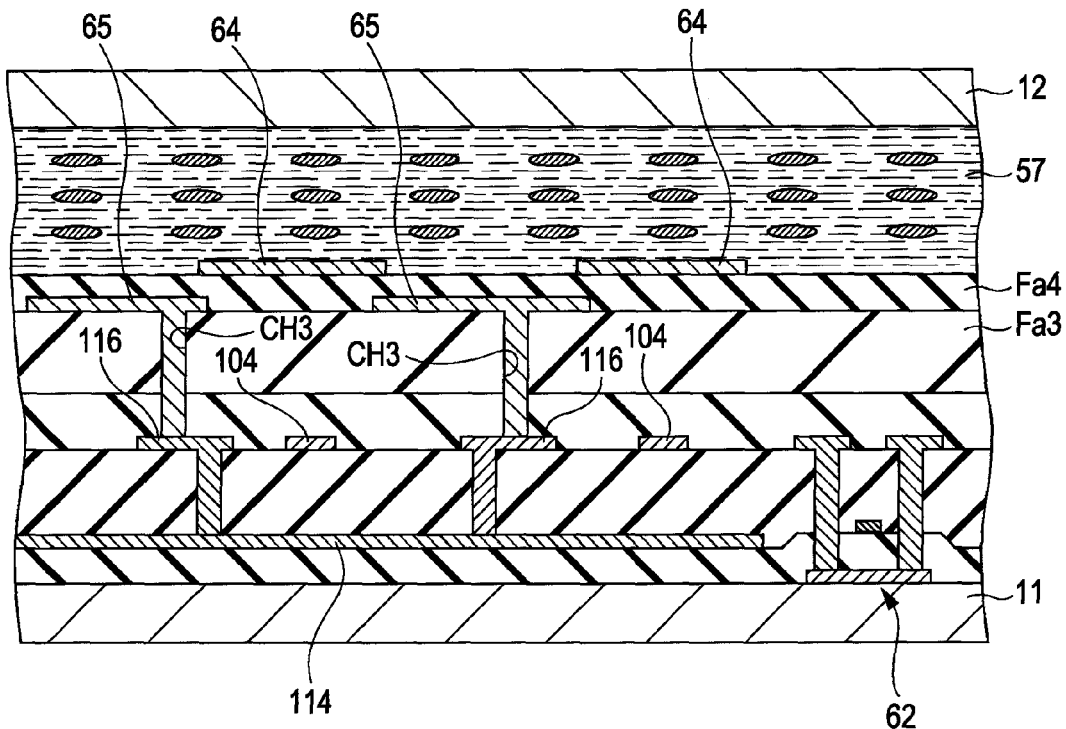
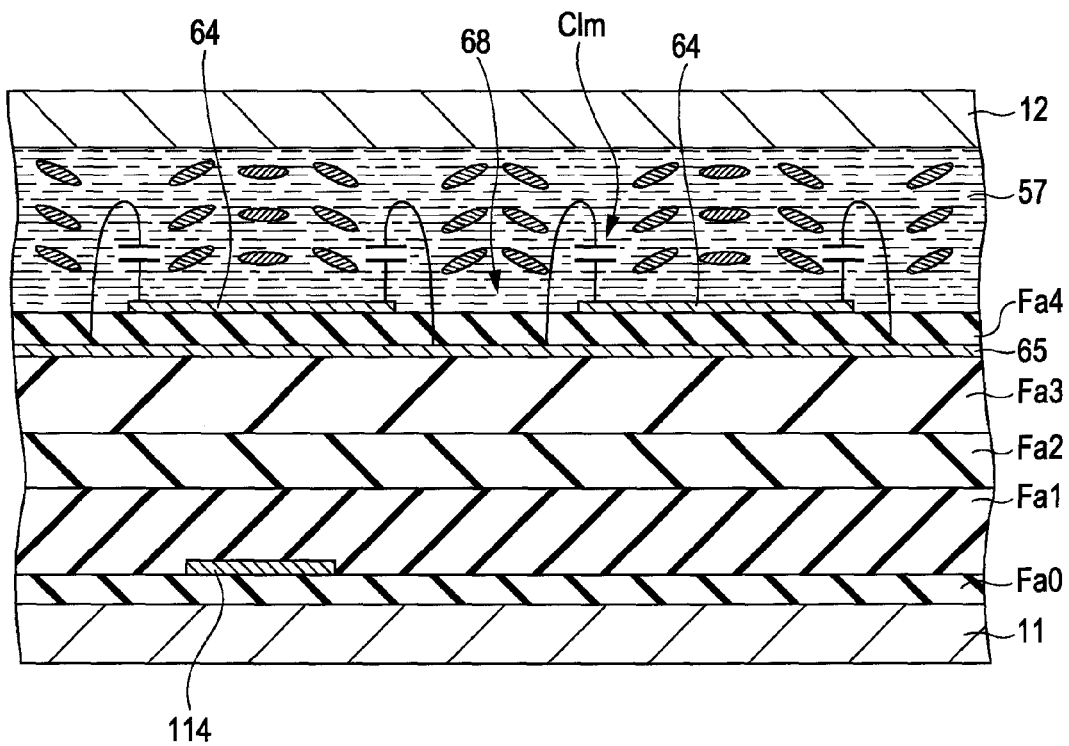

ELECTRO-OPTICAL DEVICE, ELECTRONIC APPARATUS, AND CONTACT DETECTION METHOD

RELATED APPLICATIONS

The present application is based on, and claims priority from, Japanese Patent Application Number 2008-129300, May 16, 2008, the disclosure of which is hereby incorporated by reference herein in its entirety.

BACKGROUND

1. Technical Field

The present invention relates to an electro-optical device, an electronic apparatus, and a contact detection method for detecting the touching of an object such as a finger, a pen, or the like on a screen.

2. Related Art

A liquid crystal display device that has a touch-screen function is described in JP-T-2007-510949. The related-art liquid crystal display device that is described in JP-T-2007-510949 judges whether a screen is touched or not by detecting a change in the capacitance value of a capacitive element, which is made up of two electrodes that are respectively provided on two substrates arrayed opposite to each other and liquid crystal that is sandwiched between these electrodes.

In the operation of a liquid crystal display device, an alternating voltage is applied to liquid crystal in order to prevent the occurrence of image quality degradation such as a burn-in problem or the like. For example, a data electric potential that is applied to a pixel electrode, that is, the level of a data voltage that is applied to a pixel electrode, is alternated between a high level that is applied during a high electric potential period and a low level that is applied during a low electric potential period repeatedly whereas a common electric potential Vcom that is applied to a common electrode is taken as a reference. When liquid crystal is AC driven with an alternating level shift as explained above, the capacitance value of a capacitive element changes when it is not supposed to due to variations in the common electric potential Vcom as the level of the common voltage Vcom varies during the AC driving of the liquid crystal. In such a case, the accuracy of touch detection decreases because it is affected by the change in the capacitance value of the capacitive element due to the change in the level of the common voltage Vcom.

SUMMARY

An advantage of some aspects of the invention is provide an electro-optical device, an electronic apparatus, and a contact detection method that makes it possible to perform contact detection such as touch detection with high judgment accuracy.

In order to address the above-identified problems without any limitation thereto, an electro-optical device according to a first aspect of the invention includes: a screen on which an image is displayed; a first substrate and a second substrate that are provided opposite to each other; liquid crystal that is sandwiched between the first substrate and the second substrate; an electrostatic capacity detecting section that outputs a detection signal whose level corresponds to the value of a capacitance that is formed by the liquid crystal, a first electrode, and a second electrode; an image displaying section that includes the liquid crystal, a third electrode, and a fourth electrode, the image displaying section controlling the transmission factor of the liquid crystal for displaying an image on the screen; a first memorizing section that memorizes the level of the detection signal outputted by the electrostatic capacity detecting section in a state in which a detection target object is not in contact with the screen as reference data; a second memorizing section that memorizes the level of the detection signal outputted by the electrostatic capacity detecting section in a state in which a judgment is made as to whether the screen is contacted or not as detection target data; a difference data generating section that generates a difference between the reference data that has been read out of the first memorizing section and the detection target data that has been read out of the second memorizing section as difference data; and a judging section that judges whether the detection target object is in contact with the screen or not on the basis of the difference data.

With such a configuration of an electro-optical device according to the first aspect of the invention, it is possible to judge whether a detection target object is in contact with a screen or not on the basis of difference data, which is a difference between reference data read out of the first memorizing section and detection target data read out of the second memorizing section. The level of a detection signal in a state in which the detection target object is not in contact with the screen is memorized as the reference data. The level of a detection signal in a state in which a judgment is made as to whether the screen is contacted or not is memorized as the detection target data. In the configuration of an electro-optical device according to the first aspect of the invention described above, all of the first electrode, the second electrode, the third electrode, and the fourth electrode may be provided on the surface of either one of the first substrate and the second substrate.

It is preferable that an electro-optical device according to the first aspect of the invention should further include a driving section that supplies an electric potential to the third electrode and supplies an electric potential to the fourth electrode so as to control the state of alignment of the liquid crystal, the driving section switching over the driving state of the liquid crystal at a predetermined cycle between a first driving state in which a first fixed potential is applied to the third electrode whereas a data potential that is in accordance with gradation to be displayed is applied to the fourth electrode and a second driving state in which a second fixed potential is applied to the third electrode whereas the data potential is applied to the fourth electrode; and a controlling section that controls the operation of writing into the first memorizing section and the second memorizing section and the operation of reading out of the first memorizing section and the second memorizing section so as to ensure that the driving state of the liquid crystal corresponding to the reference data that is read out of the first memorizing section should be the same as the driving state of the liquid crystal corresponding to the detection target data that is read out of the second memorizing section.

With such a preferred configuration, it is possible to ensure that the driving state of liquid crystal at the time of the acquisition of the reference data is the same as the driving state of liquid crystal at the time of the acquisition of the detection target data for a reliable comparison of the detection target data with the reference data when making a contact judgment such as a touch judgment. If a difference in the driving state of liquid crystal is not taken into consideration at all, it is not guaranteed that the driving state of liquid crystal at the time of the acquisition of the reference data is the same as the driving state of liquid crystal at the time of the acquisition of the detection target data. In such a case, the driving state of liquid crystal at the time of the acquisition of the detection target data could be different from the driving state of liquid crystal at the time of the acquisition of the reference data. If the driving state of liquid crystal at the time of the acquisition of the detection target data is different from the driving state of liquid crystal at the time of the acquisition of the reference data, a capacitance value varies when it is not supposed to because of variations in the level of the common voltage Vcom. Therefore, it is difficult to obtain an accurate contact judgment result when the detection target data is compared with the reference data. In contrast, in the operation of an electro-optical device according to the first aspect of the invention, which has the configuration explained above, it is ensured that the driving state of liquid crystal (i.e., the level of the common voltage Vcom) at the time of the acquisition of the reference data is the same as the driving state of liquid crystal at the time of the acquisition of the detection target data. Therefore, it is possible to eliminate variations in the capacitance value that are caused by a difference between the driving state of liquid crystal at the time of the acquisition of the reference data and the driving state of liquid crystal at the time of the acquisition of the detection target data. For this reason, it is possible to make a contact judgment with high accuracy.

In the preferred configuration of an electro-optical device described above, it is further preferable that the controlling section should cause the first memorizing section to memorize the reference data detected in the first driving state and the reference data detected in the second driving state; the controlling section should cause the second memorizing section to memorize the detection target data detected in either one of the first driving state and the second driving state; the controlling section should read the detection target data detected in the either one of the first driving state and the second driving state out of the second memorizing section and then supply the readout detection target data to the difference data generating section; and the controlling section should read the reference data corresponding to the either one of the first driving state and the second driving state out of the first memorizing section and then supply the readout reference data to the difference data generating section. With such a preferred configuration, it is possible to ensure that the driving state of liquid crystal at the time of the acquisition of the reference data is the same as the driving state of liquid crystal at the time of the acquisition of the detection target data for a reliable comparison of the detection target data with the reference data when making a contact judgment.

In the preferred configuration of an electro-optical device described above, it is further preferable that the controlling section should cause the first memorizing section to memorize the reference data detected in either one of the first driving state and the second driving state; and the controlling section should cause the second memorizing section to memorize the detection target data detected in the either one of the first driving state and the second driving state. With such a preferred configuration, it is possible to ensure that the driving state of liquid crystal at the time of the acquisition of the reference data is the same as the driving state of liquid crystal at the time of the acquisition of the detection target data for a reliable comparison of the detection target data with the reference data when making a contact judgment.

It is preferable that an electro-optical device according to the first aspect of the invention should further include: a driving section that supplies an electric potential to the third electrode and supplies an electric potential to the fourth electrode so as to control the state of alignment of the liquid crystal, the driving section switching over the driving state of the liquid crystal at a predetermined cycle between a first driving state in which a first fixed potential is applied to the third electrode whereas a data potential that is in accordance with gradation to be displayed is applied to the fourth electrode and a second driving state in which a second fixed potential is applied to the third electrode whereas the data potential is applied to the fourth electrode; and a calculating section that calculates an average of the level of the detection signal outputted by the electrostatic capacity detecting section in the first driving state and the level of the detection signal outputted by the electrostatic capacity detecting section in the second driving state as average data, wherein the first memorizing section memorizes the average data calculated in a state in which a detection target object is not in contact with the screen as the reference data whereas the second memorizing section memorizes the average data calculated in a state in which a judgment is made as to whether the screen is contacted or not as the detection target data.

With such a preferred configuration, each of the reference data and the detection target data is obtained as the average data, which is an average of the level of the detection signal in the first driving state and the level of the detection signal in the second driving state. Since the average of the level of the detection signal in the first driving state and the level of the detection signal in the second driving state is found for each of the reference data and the detection target data as explained above, it is possible to ensure the same extent of an influence on a contact judgment that is attributable to variations in the capacitance value that are caused by a difference in the driving state of liquid crystal (i.e., the level of the common voltage Vcom). For this reason, it is possible to eliminate an influence on a contact judgment that is attributable to variations in the capacitance value that are caused by a difference in the driving state of liquid crystal simply by comparing the reference data and the detection target data. Thus, it is possible to make a contact judgment with high accuracy.

In the preferred configuration of an electro-optical device described above, it is further preferable that the calculating section should calculate the average data with the use of the detection signal outputted by the electrostatic capacity detecting section in one of two time periods that are adjacent to each other in time series in the predetermined cycle and further with the use of the detection signal outputted by the electrostatic capacity detecting section in the other of the two adjacent time periods. In the configuration of an electro-optical device according to the first aspect of the invention described above, it is preferable that the driving section should switch over the driving state of the liquid crystal between the first driving state and the second driving state periodically; and the periodic switchover should be performed at the predetermined cycle corresponding to a natural-number multiple of a frame period or a field period.

An electronic apparatus according to a second aspect of the invention is provided with the electro-optical device according to the first aspect of the invention, including its preferred modes. The electronic apparatus according to the second aspect of the invention can be embodied as, for example, a personal computer, a mobile phone, a personal digital assistant, an automatic vending machine, and so forth.

In order to address the above-identified problems without any limitation thereto, a third aspect of the invention provides a contact detection method that is used by an electro-optical device that includes a screen on which an image is displayed, a first substrate and a second substrate that are provided opposite to each other, liquid crystal that is sandwiched between the first substrate and the second substrate, an electrostatic capacity detecting section that outputs a detection signal whose level corresponds to the value of a capacitance that is formed by the liquid crystal, a first electrode, and a second electrode, and an image displaying section that includes the liquid crystal, a third electrode, and a fourth electrode and controls the transmission factor of the liquid crystal for displaying an image on the screen, the contact detection method enabling the contact of a detection target object and the screen to be detected with the use of the electrostatic capacity detecting section, the contact detection method comprising: memorizing the level of the detection signal in a state in which the detection target object is not in contact with the screen as reference data; memorizing the level of the detection signal in a state in which a judgment is made as to whether the screen is contacted or not as detection target data; generating a difference between the reference data and the detection target data as difference data; and judging whether the detection target object is in contact with the screen or not on the basis of the difference data.

In order to address the above-identified problems without any limitation thereto, a fourth aspect of the invention provides a contact detection method that is used by an electro-optical device that includes a screen on which an image is displayed, a first substrate and a second substrate that are provided opposite to each other, liquid crystal that is sandwiched between the first substrate and the second substrate, an electrostatic capacity detecting section that outputs a detection signal whose level corresponds to the value of a capacitance that is formed by the liquid crystal, a first electrode, and a second electrode, an image displaying section that includes the liquid crystal, a third electrode, and a fourth electrode and controls the transmission factor of the liquid crystal for displaying an image on the screen, and a driving section that supplies an electric potential to the third electrode and supplies an electric potential to the fourth electrode so as to control the state of alignment of the liquid crystal, the driving section switching over the driving state of the liquid crystal at a predetermined cycle between a first driving state in which a first fixed potential is applied to the third electrode whereas a data potential that is in accordance with gradation to be displayed is applied to the fourth electrode and a second driving state in which a second fixed potential is applied to the third electrode whereas the data potential is applied to the fourth electrode, the contact detection method enabling the contact of a detection target object and the screen to be detected with the use of the electrostatic capacity detecting section, the contact detection method comprising: acquiring the level of the detection signal in a state in which the detection target object is not in contact with the screen as reference data and memorizing the reference data acquired in the first driving state and the reference data acquired in the second driving state; acquiring the level of the detection signal in a state in which a judgment is made as to whether the screen is contacted or not as detection target data and memorizing the acquired detection target data in either one of the first driving state and the second driving state; reading the detection target data acquired in the either one of the first driving state and the second driving state and reading the reference data corresponding to the either one of the first driving state and the second driving state so as to generate a difference between the readout reference data and the readout detection target data as difference data; and judging whether the detection target object is in contact with the screen or not on the basis of the difference data.

In order to address the above-identified problems without any limitation thereto, a fifth aspect of the invention provides a contact detection method that is used by an electro-optical device that includes a screen on which an image is displayed, a first substrate and a second substrate that are provided opposite to each other, liquid crystal that is sandwiched between the first substrate and the second substrate, an electrostatic capacity detecting section that outputs a detection signal whose level corresponds to the value of a capacitance that is formed by the liquid crystal, a first electrode, and a second electrode, an image displaying section that includes the liquid crystal, a third electrode, and a fourth electrode and controls the transmission factor of the liquid crystal for displaying an image on the screen, and a driving section that supplies an electric potential to the third electrode and supplies an electric potential to the fourth electrode so as to control the state of alignment of the liquid crystal, the driving section switching over the driving state of the liquid crystal at a predetermined cycle between a first driving state in which a first fixed potential is applied to the third electrode whereas a data potential that is in accordance with gradation to be displayed is applied to the fourth electrode and a second driving state in which a second fixed potential is applied to the third electrode whereas the data potential is applied to the fourth electrode, the contact detection method enabling the contact of a detection target object and the screen to be detected with the use of the electrostatic capacity detecting section, the contact detection method comprising: acquiring the level of the detection signal in a state in which the detection target object is not in contact with the screen as reference data and memorizing the acquired reference data in either one of the first driving state and the second driving state; acquiring the level of the detection signal in a state in which a judgment is made as to whether the screen is contacted or not as detection target data and memorizing the detection target data acquired in the either one of the first driving state and the second driving state; generating a difference between the reference data and the detection target data as difference data; and judging whether the detection target object is in contact with the screen or not on the basis of the difference data.

In order to address the above-identified problems without any limitation thereto, a sixth aspect of the invention provides a contact detection method that is used by an electro-optical device that includes a screen on which an image is displayed, a first substrate and a second substrate that are provided opposite to each other, liquid crystal that is sandwiched between the first substrate and the second substrate, an electrostatic capacity detecting section that outputs a detection signal whose level corresponds to the value of a capacitance that is formed by the liquid crystal, a first electrode, and a second electrode, an image displaying section that includes the liquid crystal, a third electrode, and a fourth electrode and controls the transmission factor of the liquid crystal for displaying an image on the screen, and a driving section that supplies an electric potential to the third electrode and supplies an electric potential to the fourth electrode so as to control the state of alignment of the liquid crystal, the driving section switching over the driving state of the liquid crystal at a predetermined cycle between a first driving state in which a first fixed potential is applied to the third electrode whereas a data potential that is in accordance with gradation to be displayed is applied to the fourth electrode and a second driving state in which a second fixed potential is applied to the third electrode whereas the data potential is applied to the fourth electrode, the contact detection method enabling the contact of a detection target object and the screen to be detected with the use of the electrostatic capacity detecting section, the contact detection method comprising: calculating an average of the level of the detection signal in the first driving state and the level of the detection signal in the second driving state as average data; memorizing the average data calculated in a state in which a detection target object is not in contact with the screen as reference data; memorizing the average data calculated in a state in which a judgment is made as to whether the screen is contacted or not as detection target data; generating a difference between the reference data and the detection target data as difference data; and judging whether the detection target object is in contact with the screen or not on the basis of the difference data.

BRIEF DESCRIPTION OF THE DRAWINGS

The invention will be described with reference to the accompanying drawings, wherein like numbers reference like elements.

FIG. 16 is a set of flowcharts that schematically illustrates an example of processing performed by an electro-optical device according to a third embodiment of the invention; more specifically, FIG. 16A schematically illustrates an example of initialization processing according to the third embodiment of the invention whereas FIG. 16B schematically illustrates an example of touch-judgment processing according to the third embodiment of the invention.

FIG. 18 is a sectional view taken along the line XVIII-XVIII of FIG. 17.

FIG. 19 is a sectional view taken along the line XIX-XIX of FIG. 17.

DESCRIPTION OF EXEMPLARY EMBODIMENTS

A: First Embodiment

Figure 1:
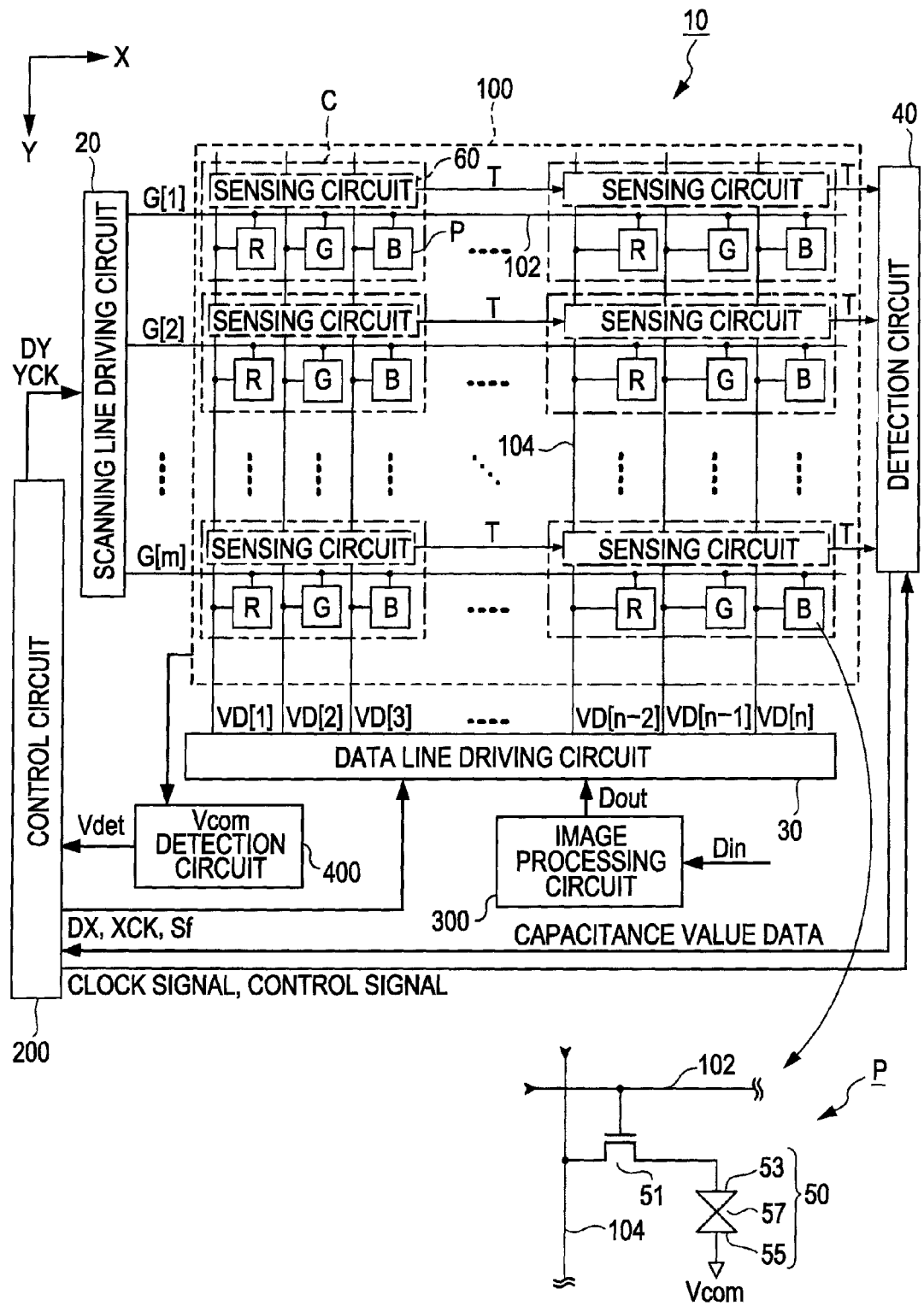
FIG. 1 is a block diagram that schematically illustrates an example of the configuration of an electro-optical device according to a first embodiment of the invention.

FIG. 1 is a block diagram that schematically illustrates an example of the configuration of an electro-optical device 10 according to a first embodiment of the invention. As illustrated therein, the electro-optical device 10 is provided with a pixel area 100, a scanning line driving circuit 20, a data line driving circuit 30, a detection circuit 40, a control circuit 200, an image processing circuit 300, and a Vcom detection circuit 400. The pixel area 100 has a plurality of lines formed thereon. Specifically, "m" scanning lines 102 are arrayed in parallel with one another in such a manner that each thereof extends in the X direction in the pixel area 100, where "m" is a natural number that is greater than two, or, at the smallest, equal to two. On the other hand, "n" data lines 104 are arrayed in parallel with one another in such a manner that each thereof extends in the Y direction in the pixel area 100, where "n" is also a natural number that is greater than two, or, at the smallest, equal to two. Each of a plurality of pixel circuits P is provided at a position corresponding to the intersection of a scanning line 102 and a data line 104. Therefore, the plurality of pixel circuits P is arrayed in a matrix of m rows and n columns. A back lighting device is provided at the back of the pixel area 100, though not illustrated in the drawing. Light emitted from the backlight propagates toward the rear of the pixel area 100. Then, the light goes out through each of the plurality of pixel circuits P provided therein.

The control circuit 200 generates a Y transfer start pulse DY and a Y clock signal YCK. Then, the control circuit 200 supplies the Y transfer start pulse DY and the Y clock signal YCK to the scanning line driving circuit 20. The scanning line driving circuit 20 supplies scanning signals Gi (i=1 to m) to the m number of scanning lines 102. By this means, the scanning line driving circuit 20 selects the m number of scanning lines 102 in a sequential manner. For example, a scanning signal G1 that is outputted to a first-row scanning line 102 is a pulse that has a width corresponding to one horizontal scanning period (1H) from the start timing of one vertical scanning period (1F). Thereafter, this pulse is shifted sequentially by a shift amount of 1H at a time. With such a sequential shift, scanning signals G2-Gm are outputted to a second-row scanning line 102 to an m-th row scanning line 102, respectively.

The control circuit 200 generates an X transfer start pulse DX, an X clock signal XCK, and a polarity signal Sf. Then, the control circuit 200 supplies the X transfer start pulse DX, the X clock signal XCK, and the polarity signal Sf to the data line driving circuit 30. The image processing circuit 300 performs image processing on input image data Din so as to generate output image data Dout. The image processing circuit 300 supplies the generated output image data Dout to the data line driving circuit 30. The data line driving circuit 30 supplies data electric potential VDj (j=1 to n) to each of a plurality of pixel circuits P that is arrayed in one row that corresponds to a scanning line 102 that is selected by the scanning line driving circuit 20. The level of the data voltage VDj that is supplied to each of the plurality of pixel circuits P that is arrayed in the selected row corresponds to gradation that is to be displayed thereat.

The polarity signal Sf indicates the polarity of a voltage that is applied to liquid crystal. In the operation of the electro-optical device 10 according to the present embodiment of the invention, the polarity of a voltage that is applied to liquid crystal is reversed every one frame. Specifically, a data electric potential (i.e., data voltage) VD that is applied to a pixel electrode is alternated between a high level that is applied during a high electric potential period and a low level that is applied during a low electric potential period whereas a common electric potential Vcom that is applied to a common electrode is taken as a reference. The high electric potential period and the low electric potential period alternate with each other at each lapse of one frame. The polarity signal Sf is supplied to a power supply circuit that is not illustrated in the drawing. The power supply circuit generates the common electric potential Vcom that is inverted from a low/high level to a high/low level every one frame in synchronization with the polarity signal Sf. Then, the power supply circuit supplies the generated common electric potential Vcom to a common electrode.

The Vcom detection circuit 400 performs detection as to whether the voltage of the common electrode is in a high level (i.e., high potential) or a low level (i.e., low potential). Then, the Vcom detection circuit 400 outputs the result of the voltage-level detection as a detection signal Vdet to the control circuit 200. Since the common voltage Vcom that is supplied to the common electrode is generated on the basis of the polarity signal Sf, the polarity signal Sf may be used in place of the detection signal Vdet. That is, it is possible to omit the Vcom detection circuit 400 by using the polarity signal Sf in place of the detection signal Vdet. However, since a large parasitic capacitance occurs at the common electrode, it takes time for the level of the common voltage Vcom to actually become inverted after that the power supply circuit performed operation for the inversion of the level of the common voltage Vcom. For this reason, though it is possible to omit the Vcom detection circuit 400, it is advantageous to include the Vcom detection circuit 400 in the configuration of the electro-optical device 10 according to the present embodiment of the invention, which makes it possible for the control circuit 200 to accurately detect the level of the common voltage Vcom.

As illustrated in FIG. 1, each of the plurality of pixel circuits P is provided with a liquid crystal element 50 and a transistor 51. The liquid crystal element 50 is made up of a pixel electrode 53, a common electrode 55, and liquid crystal 57. An electric field that is generated between the pixel electrode 53 and the common electrode 55 is applied to the liquid crystal 57. The common electric potential Vcom is supplied to the common electrode 55. A horizontal electric-field scheme is adopted for the operation of the electro-optical device 10 according to the present embodiment of the invention. Specifically, the electro-optical device 10 utilizes a horizontal electric field that is generated between the pixel electrode 53 and the common electrode 55 in order to control the orientation state, that is, alignment state, of the liquid crystal 57. A more detailed explanation of the operation thereof will be given later. The transistor 51 is a N-channel type thin film transistor (TFT). Being provided between the data line 104 and the pixel electrode 53, the transistor 51 controls the electric connection between the data line 104 and the pixel electrode 53. The gate terminal of the transistor 51 is connected to the scanning line 102. Therefore, when the scanning line 102 of the i-th row is selected, the transistor 51 of each of the plurality of pixel circuits P that are arrayed in the i-th row is put into an ON state. As the transistors 51 of the plurality of i-th row pixel circuits P turn ON, data electric potential VD is supplied to the pixel electrode 53 of each of these i-th row pixel circuits P via the corresponding data line 104. As a result, a voltage (=VD−Vcom) is applied between the pixel electrode 53 and the common electrode 55 as a difference between the data electric potential VD and the common electric potential Vcom. The voltage is held for a certain time period. The liquid crystal 57 changes its orientation and/or its order of molecular association depending on the level of a voltage that is applied thereto. Therefore, it is possible to control the ratio of the amount of light that is transmitted to the monitoring side of the electro-optical device 10 to the entire amount of light that is emitted from the backlight thereof on a pixel-by-pixel basis. In other words, the transmission factor of the liquid crystal element 50 is individually controlled for each of the plurality of pixel circuits P. With such control, it is possible to modulate light so as to realize gradation display.

The reference symbol "R", "G", or "B" shown in FIG. 1 denotes the display color of each of the plurality of pixel circuits P. In the configuration of the electro-optical device 10 according to the present embodiment of the invention, three pixel circuits P corresponding to three display colors of R, G, and B make up one set of pixel circuits C. One sensing circuit 60 is provided for each set of pixel circuits C. This means that a plurality of sensing circuits 60 is provided in the pixel area 100 and that the number of the sensing circuits 60 is m×n/3 in total. Each sensing circuit 60 outputs a detection signal T. The level of the detection signal T outputted from the sensing circuit 60 corresponds to the capacitance value of a touch detection capacitive element, which will be explained later. The detection circuit 40 performs signal processing on the detection signal T outputted from each sensing circuit 60. As a result, the detection circuit 40 obtains capacitance values for one screen. The number of the capacitance values obtained by the detection circuit 40 for one screen is m×n/3. Then, the detection circuit 40 outputs the m×n/3 capacitance values for one screen, which have been obtained in this way, to the control circuit 200.

Figure 2:
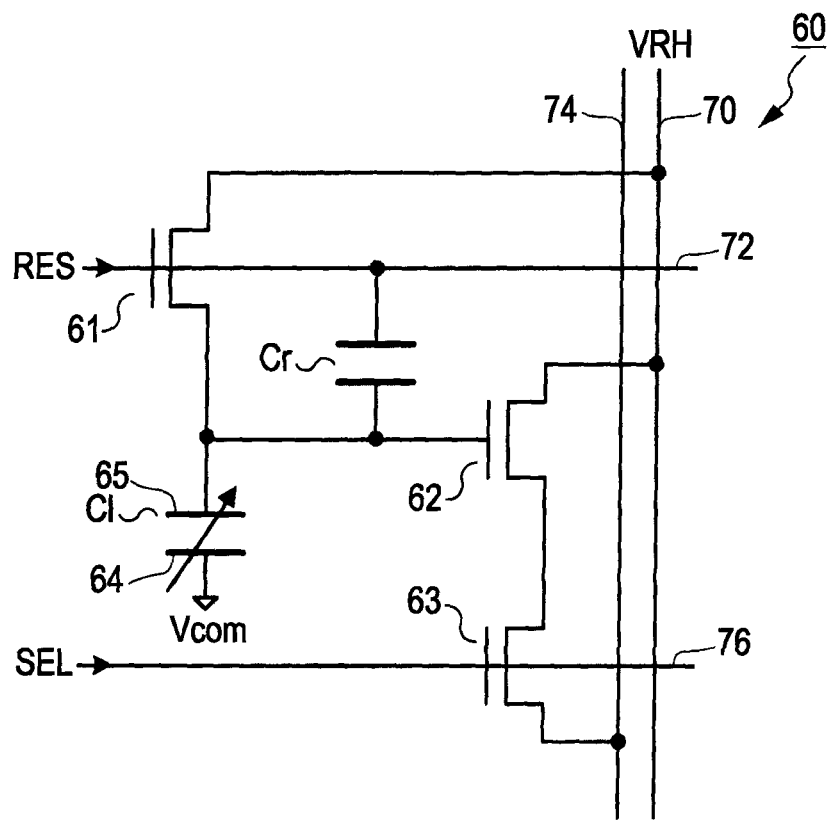
FIG. 2 is a circuit diagram that schematically illustrates an example of the configuration of a sensing circuit according to the first embodiment of the invention.
Figure 3:
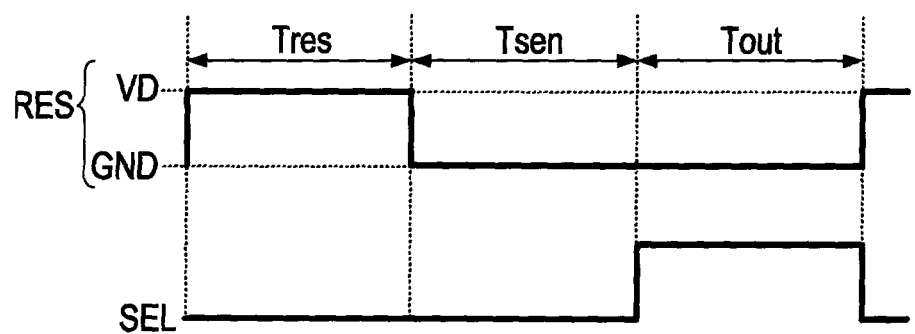
FIG. 3 is a timing chart that schematically illustrates an example of the operation of the sensing circuit according to the first embodiment of the invention.

FIG. 2 is a circuit diagram that schematically illustrates an example of the configuration of the sensing circuit 60 according to the present embodiment of the invention. The sensing circuit 60 is provided with a reset transistor 61, an amplification transistor 62, a selection transistor 63, a reference capacitance element Cr, and a touch detection capacitance element Cl. A reset signal RES is supplied to the gate terminal of the reset transistor 61 via a first control line 72. The drain terminal of the reset transistor 61 is electrically connected to a power line 70, whereas the source terminal thereof is electrically connected to the gate terminal of the amplification transistor 62. A power potential VRH is supplied to the power line 70. The drain terminal of the amplification transistor 62 is electrically connected to the power line 70, whereas the source terminal thereof is electrically connected to the drain terminal of the selection transistor 63. The source terminal of the selection transistor 63 is electrically connected to a detection line 74. A selection signal SEL is supplied to the gate terminal of the selection transistor 63 via a second control line 76. The reference capacitance element Cr is provided between the gate terminal of the amplification transistor 62 and the first control line 72. The touch detection capacitance element Cl has a first electrode 64 and a second electrode 65. The common electric potential Vcom is supplied to the first electrode 64 of the touch detection capacitance element Cl. The second electrode 65 of the touch detection capacitance element Cl is electrically connected to the gate terminal of the amplification transistor 62.

Figure 4:
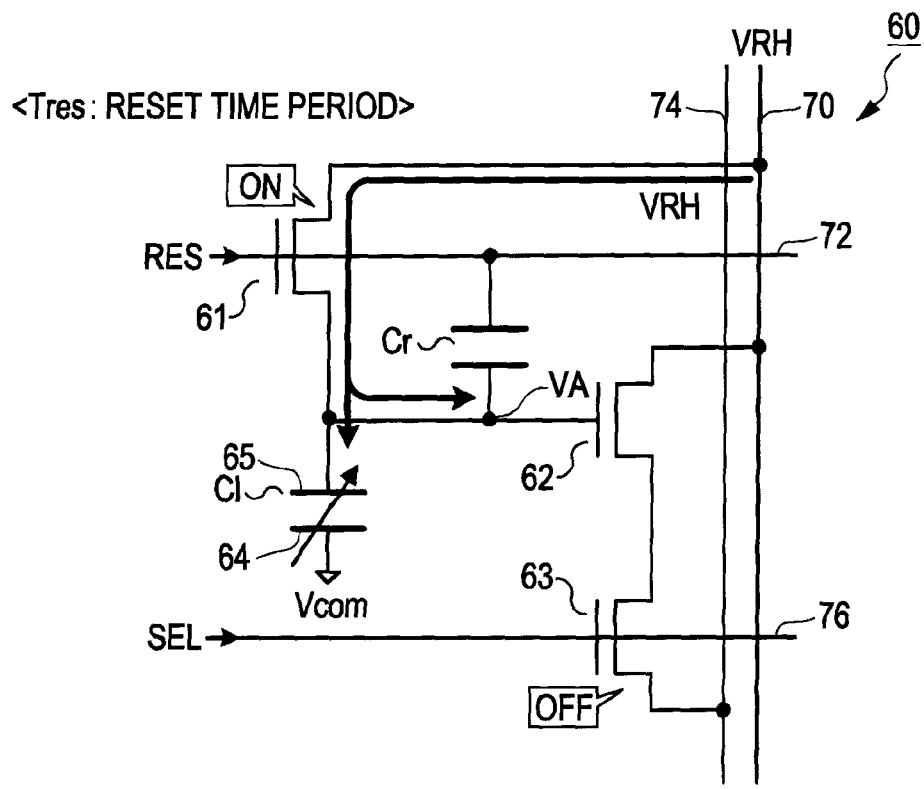
FIG. 4 is a diagram that schematically illustrates an example of the operation of the sensing circuit during a reset time period according to the first embodiment of the invention.

Next, the operation of the sensing circuit 60 is explained below while referring to FIGS. 3-6. The sensing circuit 60 operates with an operation cycle that is made up of a reset time period Tres, a sensing time period Tsen, and a readout time period Tout. The reset signal RES and the selection signal SEL are generated at the detection circuit 40. The level of the reset signal RES is set at VD during the reset time period Tres. With the reset signal RES being set at the VD level, the reset transistor 61 is set in an ON state during the reset time period Tres. Accordingly, as illustrated in FIG. 4, the gate electric potential VA of the amplification transistor 62 is reset into the power potential VRH. On the other hand, since the power potential VRH is supplied to the second electrode 65 of the touch detection capacitance element Cl, too, a voltage between the first electrode 64 of the touch detection capacitance element Cl and the second electrode 65 thereof is set at a value of VRH−Vcom.

Figure 5:
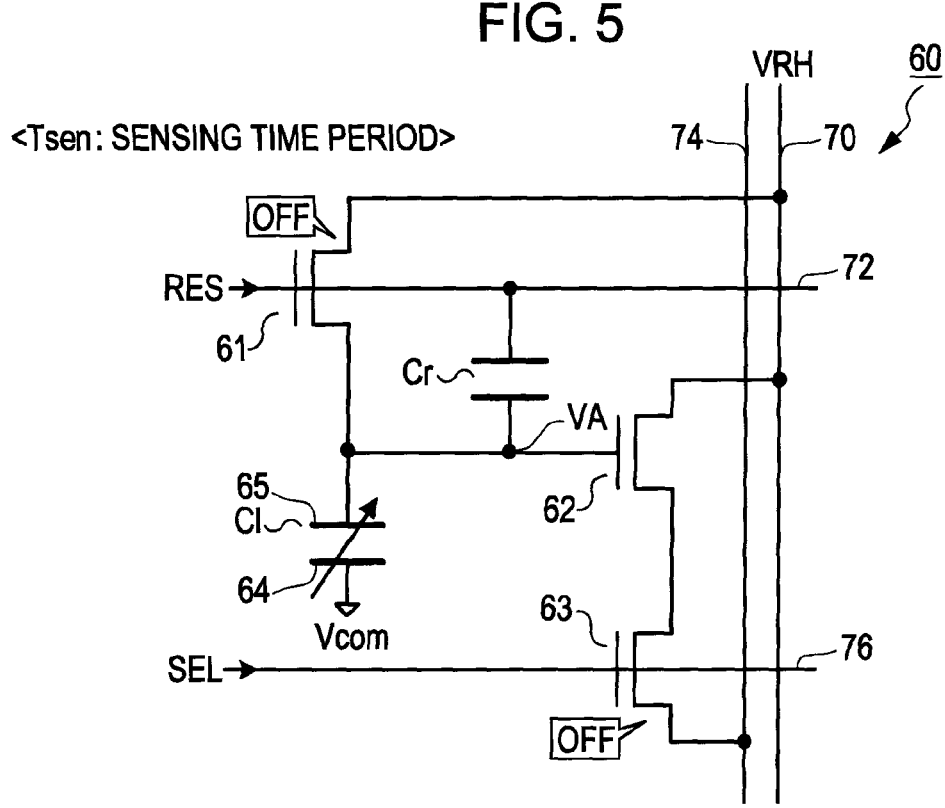
FIG. 5 is a diagram that schematically illustrates an example of the operation of the sensing circuit during a sensing time period according to the first embodiment of the invention.

Next, at the time when the operation phase transitions from the reset phase to the sensing phase, the level of the reset signal RES changes from VD to GND (=0V). Accordingly, throughout the sensing time period Tsen, the reset signal RES is set at the GND level. Therefore, as illustrated in FIG. 5, both the reset transistor 61 and the selection transistor 63 are set in an OFF state. The first control line 72 is electrically connected to one electrode of the reference capacitance element Cr. Therefore, the reference capacitance element Cr functions as a coupling capacitor. As the level of the reset signal RES changes, so does the gate electric potential VA of the amplification transistor 62. The amount of change in the gate electric potential VA of the amplification transistor 62 is a value corresponding to the ratio of the capacitance of the reference capacitance element Cr to the capacitance of the touch detection capacitance element Cl. The capacitance value of the touch detection capacitance element Cl changes when a user touches on a screen with a detection target object such as a finger, a touch pen, or the like.

Let the capacitance value of the touch detection capacitance element Cl in a non-contact state in which a detection-target object is not in contact with the surface of a screen be Clc. Let the amount of change in the capacitance value of the touch detection capacitance element Cl in a contact state in which a detection-target object is in contact with the surface of a screen be ΔClc. Let the capacitance value of the reference capacitance element Cr be Cref. Let the electric-potential change of the first control line 72 be ΔV (=VD). Under these definitions, the amount of change ΔVA in the gate electric potential VA of the amplification transistor 62 in a contact state in which a detection-target object is in contact with the surface of a screen can be mathematically expressed by the following formula (1). Note that parasitic capacitance is neglected herein. Therefore, it is possible to make the capacitance change of the touch detection capacitance element Cl reflected in the gate electric potential VA of the amplification transistor 62.

$$\Delta VA=\{(Cref\times\Delta Clc)\times\Delta V\}/\{(Cref+Clc+\Delta Clc)(Cref+Clc)\} \quad (1)$$

Figure 6:
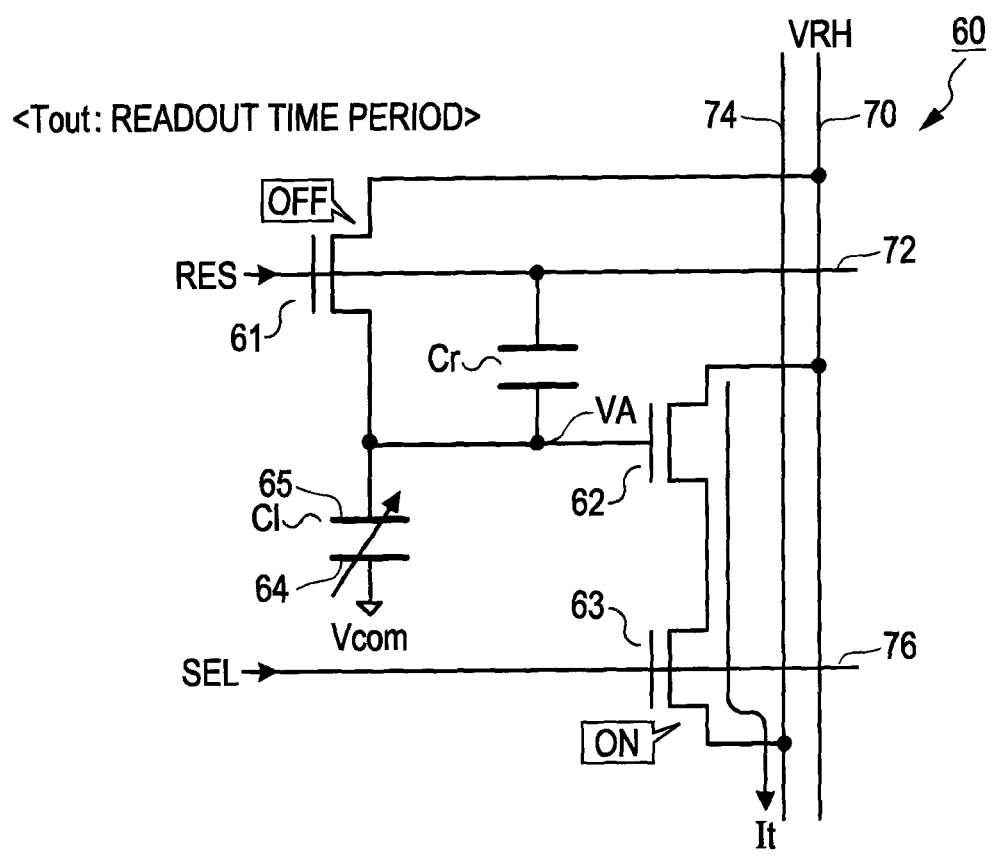
FIG. 6 is a diagram that schematically illustrates an example of the operation of the sensing circuit during a read-out time period according to the first embodiment of the invention.

Next, at the time when the operation phase transitions from the sensing phase to the readout phase, the level of the selection signal SEL changes from low to high. Accordingly, throughout the readout time period Tout, the selection signal SEL is set at the high level. With the selection signal SEL being set at the high level, as illustrated in FIG. 6, the selection transistor 63 is set in an ON state during the readout time period Tout. As a result, a detection electric current It whose level corresponds to the gate electric potential VA of the amplification transistor 62 flows on the detection line 74. The detection electric current It is outputted as the detection signal T to the detection circuit 40. Therefore, the value of the detection electric current It that is outputted in a non-contact state in which a detection-target object is not in contact with the surface of a screen is different from the value of the detection electric current It that is outputted in a contact state in which the detection-target object is in contact with the surface of the screen. In addition, as the amount of change ΔVA in the gate electric potential VA of the amplification transistor 62 in a contact state in which the detection-target object is in contact with the surface of the screen increases, a difference between the value of the detection electric current It under the non-contact condition and the value of the detection electric current It under the contact condition increases. As the difference between the value of the detection electric current It under the non-contact condition and the value of the detection electric current It under the contact condition increases, the detection sensitivity of the sensing circuit 60 improves.

Figure 7:
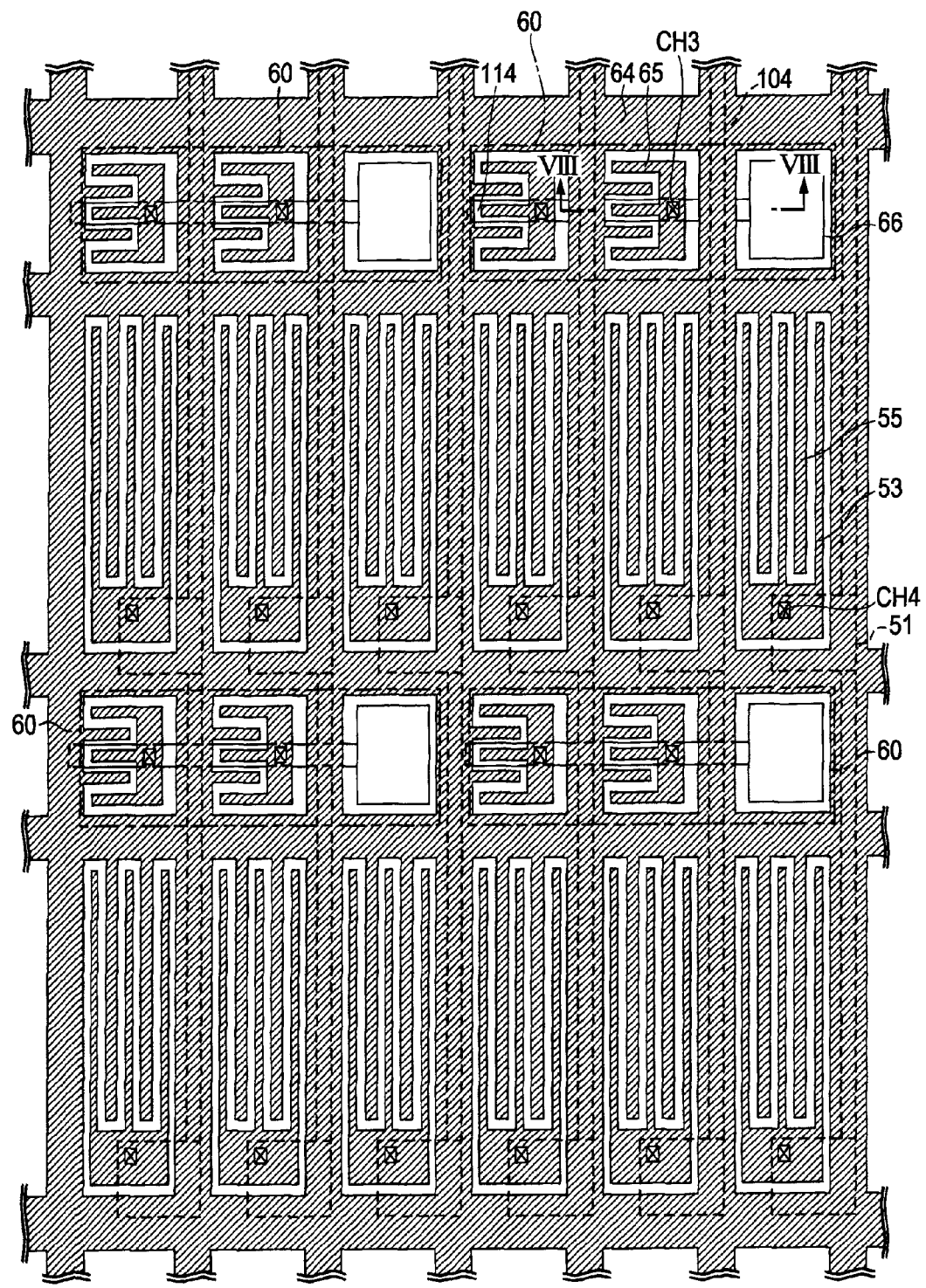
FIG. 7 is a plan view that schematically illustrates an example of the configuration of pixel circuits and sensing circuits according to the first embodiment of the invention.
Figure 8:
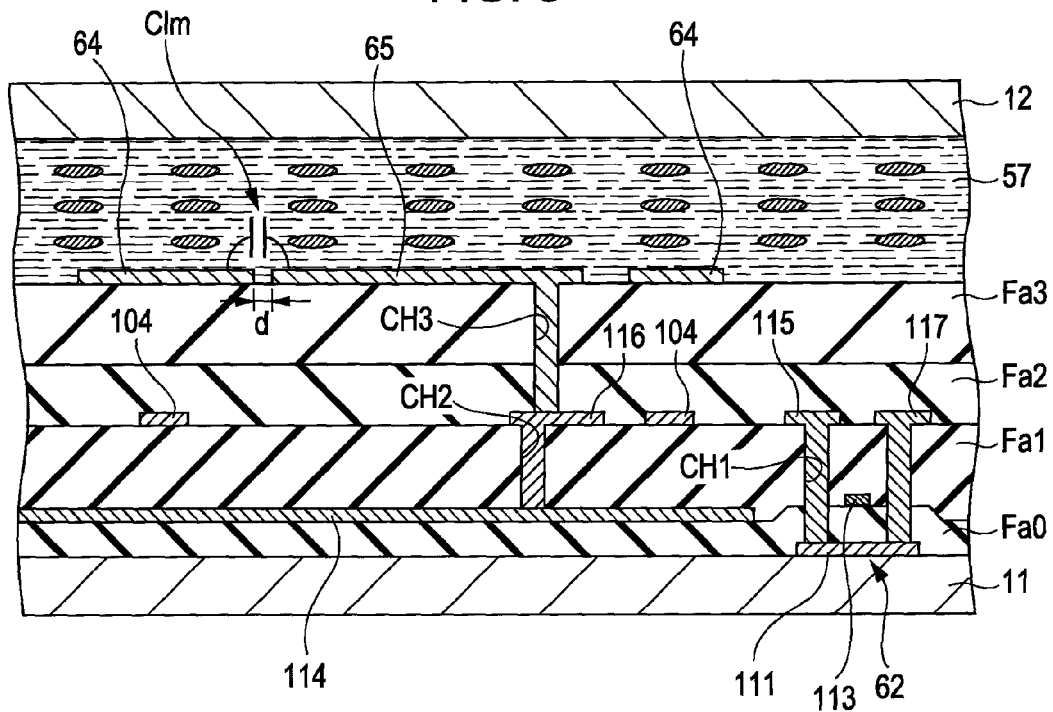
FIG. 8 is a sectional view taken along the line VIII-VIII of FIG. 7.

FIG. 7 is a plan view that schematically illustrates an example of the configuration of the pixel circuits P and the sensing circuits 60 according to the present embodiment of the invention. FIG. 8 is a sectional view taken along the line VIII-VIII of FIG. 7. As illustrated in FIG. 7, the sensing circuit 60 is made up of the first electrode 64, the second electrode 65, and a circuit part 66. The first electrode 64 and the second electrode 65 constitute the touch detection capacitance element Cl. The circuit part 66 includes circuit elements such as the amplification transistor 62 and the like. As illustrated in FIG. 8, the liquid crystal 57 is sandwiched between a first substrate 11 and a second substrate 12 that are arrayed opposite to each other. The molecules of the liquid crystal 57 are aligned in such a manner that the long axes of the liquid crystal molecules are oriented parallel to the pair of substrates 11 and 12. The amplification transistor 62, which is a component of the sensing circuit 60, is formed on one surface of the first substrate 11. The surface of the first substrate 11 on which the amplification transistor 62 is formed faces the second substrate 12. The amplification transistor 62 includes a semiconductor layer 111 and a gate electrode 113. The semiconductor layer 111 is made of a semiconductor material. The gate electrode 113 is provided opposite to the semiconductor layer 111 with a gate insulation layer Fa0 being sandwiched therebetween. The gate insulation layer Fa0 covers the semiconductor layer 111. A first insulation layer Fa1 covers the gate electrode 113. The amplification transistor 62 further includes a drain electrode 115 and a source electrode 117. Formed on the surface of the first insulation layer Fa1, each of the drain electrode 115 and the source electrode 117 is electrically connected to the semiconductor layer 111 via a first contact hole CH1. A second insulation layer Fa2 covers the drain electrode 115 and the source electrode 117.

A gate wiring 114 is formed on the surface of the gate insulation layer Fa0. The gate wiring 114 is electrically connected to the gate electrode 113. The gate electrode 113 and the gate wiring 114 are formed in the same single formation process by patterning an electro-conductive film (e.g., aluminum thin film) that is deposited over the entire surface of the gate insulation layer Fa0. In the following description of this specification, when two or more constituent elements are formed in the same single formation process by selectively removing a part of a common film substance as in the formation of the gate electrode 113 and the gate wiring 114 explained above, such a structural formation is expressed as "formed out of the same pre-pattern layer substance in the same process", or more simply as "formed out of the same layer (and/or as the same-layer elements)". It should be particularly noted that the above definition applies not only in a case where the common film substance constitutes a single layer but also in a case where the common film substance constitutes more than one layer. That is, the above definition holds true regardless of whether the common film substance constitutes a single layer or a plurality of layers.

As illustrated in FIG. 8, the first insulation layer Fa1 covers the gate wiring 114. The data line 104 and an electro-conductive layer 116 are formed on the surface of the first insulation layer Fa1. The data line 104 and the electro-conductive layer 116 are formed out of the same pre-pattern layer substance in the same process. The electro-conductive layer 116 is electrically connected to the gate wiring 114 via a second contact hole CH2. The second insulation layer Fa2 covers the data line 104 and the electro-conductive layer 116. A third insulation layer Fa3 is deposited as a layer that covers the second insulation layer Fa2.

A plurality of first electrodes 64 and a plurality of second electrodes 65 are formed on the surface of the third insulation layer Fa3. The first electrode 64 and the second electrode 65 are formed out of the same pre-pattern layer substance in the same process. The first electrode 64 is made of an electro-conductive material. The second electrode 65 is also made of an electro-conductive material. Each of the plurality of second electrodes 65 is electrically connected to the electro-conductive layer 116 via a third contact hole CH3. This means that each second electrode 65 is electrically connected to the gate electrode 113 of the amplification transistor 62 via the electro-conductive layer 116 and the gate wiring 114. When a voltage (=VRH−Vcom) is applied between the first electrode 64 and the second electrode 65, an electric field that acts in a direction that is substantially parallel to the substrates, that is, in a horizontal direction, occurs between the first electrode 64 and the second electrode 65. The electric field that is generated between the first electrode 64 and the second electrode 65 is applied to the liquid crystal 57. As illustrated in FIG. 8, a plurality of capacitances Clm each of which is made up of the first electrode 64, the second electrode 65, and the liquid crystal 57 to which the electric field is applied is generated. The plurality of capacitances Clm constitutes the touch detection capacitance element Cl illustrated in FIG. 2.

Though not specifically illustrated in FIG. 8, the pixel electrode 53 and the common electrode 55 that make up each pixel circuit P are formed on the surface of the third insulation layer Fa3. The pixel electrode 53 and the common electrode 55 are formed out of the same layer as defined above. An electric field that acts in a direction that is substantially parallel to the substrates (i.e., in a horizontal direction) is generated between the pixel electrode 53 and the common electrode 55. The orientation/alignment of the liquid crystal 57 is controlled due to the generated horizontal electric field. The transistor 51 of each of the plurality of pixel circuits P is manufactured in the same process as the manufacturing process of the amplification transistor 62 of each sensing circuit 60. The drain terminal of the transistor 51 is electrically connected to the pixel electrode 53 via a fourth contact hole CH4 that is illustrated in FIG. 7.

Figure 9:
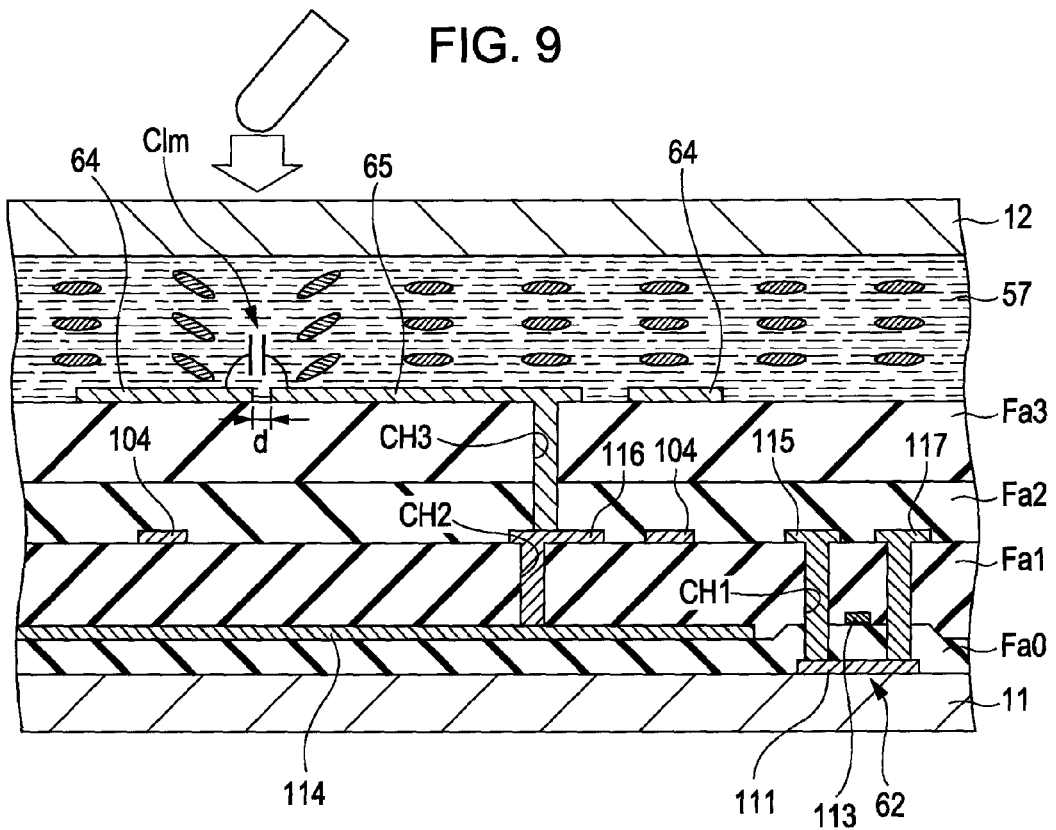
FIG. 9 is a sectional view that schematically illustrates an example of a contact state in which a detection-target object is in contact with the surface of a screen according to the first embodiment of the invention.

Next, an explanation is given below of a change in the capacitance value of the touch detection capacitance element Cl. In a non-touch state in which a detection-target object such as a finger, a touch pen, or the like is not in contact with the surface of a screen, the first substrate 11 and the second substrate 12 are parallel to each other as illustrated in FIG. 8. In contrast, upon the touching of the detection-target object on the surface of the screen as shown in FIG. 9, a distance between the first substrate 11 and the second substrate 12 decreases because the second substrate 12 becomes deflected due to contact pressure. As a result, the orientation of the liquid crystal 57 that is sandwiched between the first substrate 11 and the second substrate 12 is disordered. Since the alignment of the liquid crystal 57 is disordered, the value of the capacitance Clm changes. That is, the capacitance value of the touch detection capacitance element Cl changes.

As understood from the foregoing mathematical formula (1), the amount of change $\Delta VA$ in the gate electric potential VA of the amplification transistor 62 increases as the amount of change $\Delta Clc$ in the capacitance value of the touch detection capacitance element Cl from a non-contact state in which the detection-target object is not in contact with the surface of the screen to a contact state in which the detection-target object is in contact with the surface of the screen increases. As the amount of change $\Delta VA$ in the gate electric potential VA of the amplification transistor 62 increases, so does the detection sensitivity of the sensing circuit 60. A distance "d" between the first electrode 64 and the second electrode 65 is one of parameters that influence when it is attempted to increase the amount of change $\Delta Clc$ in the capacitance value of the touch detection capacitance element Cl between the non-contact state and the contact state. There exists a certain value of the distance d that maximizes the detection sensitivity of the sensing circuit 60. In a separate-electrode configuration in which one electrode is provided on the surface of the first substrate 11 and which the other electrode is provided on the surface of the second substrate 12, the distance between these two electrodes depends on the distance between the first substrate 11 and the second substrate 12 arrayed opposite to each other. That is, in such a separate-electrode configuration, the distance between these two electrodes corresponds to the value of a cell gap. Since the cell gap value is determined on the basis of the display characteristics of the electro-optical device 10, it is practically impossible to change this value without any limitation. For this reason, if the distanced-electrode configuration in which one electrode is provided on the surface of the first substrate 11 and which the other electrode is provided on the surface of the second substrate 12 explained above is adopted, it is difficult to adjust an interelectrode distance so as to maximize the detection sensitivity of the sensing circuit 60. That is, if the separate-electrode configuration is adopted, the detection sensitivity of the sensing circuit 60 must be sacrificed if a higher priority is given to the display characteristics of the electro-optical device 10. On the other hand, it is not possible to optimize the display characteristics of the electro-optical device 10 if the detection sensitivity of the sensing circuit 60 is prioritized over the display characteristics thereof.

In this respect, in the configuration of the electro-optical device 10 according to the present embodiment of the invention, both of the first electrode 64 and the second electrode 65 that constitute the touch detection capacitance element Cl are provided on the surface of the first substrate 11 that faces the second substrate 12. With such a configuration, it is possible to set the distance d between the first electrode 64 and the second electrode 65 at a value that maximizes the detection sensitivity of the sensing circuit 60 independently of the cell gap value. That is, since both of the first electrode 64 and the second electrode 65 that constitute the touch detection capacitance element Cl are provided on the surface of the first substrate 11 that faces the second substrate 12, it is possible to set the distance d between the first electrode 64 and the second electrode 65 so as to maximize the detection sensitivity of the sensing circuit 60 independently while setting the cell gap at a value that optimizes the display characteristics of the electro-optical device 10. In addition, since the molecules of the liquid crystal 57 are aligned in such a manner that the long axes thereof are oriented parallel to the pair of substrates 11 and 12 in the configuration of the electro-optical device 10 according to the present embodiment of the invention, it is possible to ensure that the alignment state of the liquid crystal molecules returns to its original orientation at an earlier point in time after the pressing of the screen in comparison with a configuration in which the long axes of the liquid crystal molecules are oriented perpendicular to the pair of substrates 11 and 12.

Referring back to FIG. 7, an explanation of the configuration of the pixel circuits P and the sensing circuits 60 according to the present embodiment of the invention is continued below. As illustrated in FIG. 7, the first electrode 64 has a shape that resembles teeth of a comb. Each tooth of the first electrode 64 extends in one direction. The second electrode 65 also has a shape that resembles teeth of a comb. Each tooth of the second electrode 65 extends in the other opposite direction. The teeth of the first-electrode comb and the teeth of the second-electrode comb are staggered as if they were in engagement with each other or filled gaps each other with a clearance being left therebetween when viewed in plan. With such a staggered comb-teeth array pattern, it is possible to secure a larger electrode adjoining area part at which the first electrode 64 and the second electrode 65 are arrayed in the proximity of each other in comparison with other array pattern in which, for example, the first electrode 64 that is formed to have a rectangular area shape and the second electrode 65 that is also formed to have a rectangular area shape are distanced from each other. That is, in comparison with the rectangular array pattern in which the rectangular first electrode 64 and the rectangular second electrode 65 are distanced from each other, the staggered comb-teeth array pattern illustrated in FIG. 7 offers a larger electric-field application area, that is, an area at which an electric field can be applied. Because of such a larger electric-field application area, it is easier to cause a change in the orientation of liquid crystal molecules. Accordingly, the amount of change $\Delta$VA in the gate electric potential VA of the amplification transistor 62 increases as the amount of change $\Delta$Clc in the capacitance value of the touch detection capacitance element Cl from a non-contact state in which the detection-target object is not in contact with the surface of the screen to a contact state in which the detection-target object is in contact with the surface of the screen increases. As the amount of change $\Delta$VA in the gate electric potential VA of the amplification transistor 62 increases, so does the detection sensitivity of the sensing circuit 60.

As illustrated in FIG. 7, the first electrode 64 of the sensing circuit 60 and the common electrode 55 of the pixel circuit P are formed out of the same layer as defined above. In addition, the second electrode 65 of the sensing circuit 60 and the pixel electrode 53 of the pixel circuit P are formed out of the same layer as defined above. Therefore, it is possible to manufacture the sensing circuit 60 and the pixel circuit P in the same manufacturing process at the same time, which makes it easier to manufacture a liquid crystal panel. Moreover, as illustrated in FIG. 7, the first electrode 64 and the common electrode 55 are formed as a continuous single electrode plane. The common electric potential Vcom is supplied to the first electrode 64 and the common electrode 55. Therefore, it is not necessary to make the level of a voltage that is applied to the first electrode 64 different from the level of a voltage that is applied to the common electrode 55.

Figure 10:
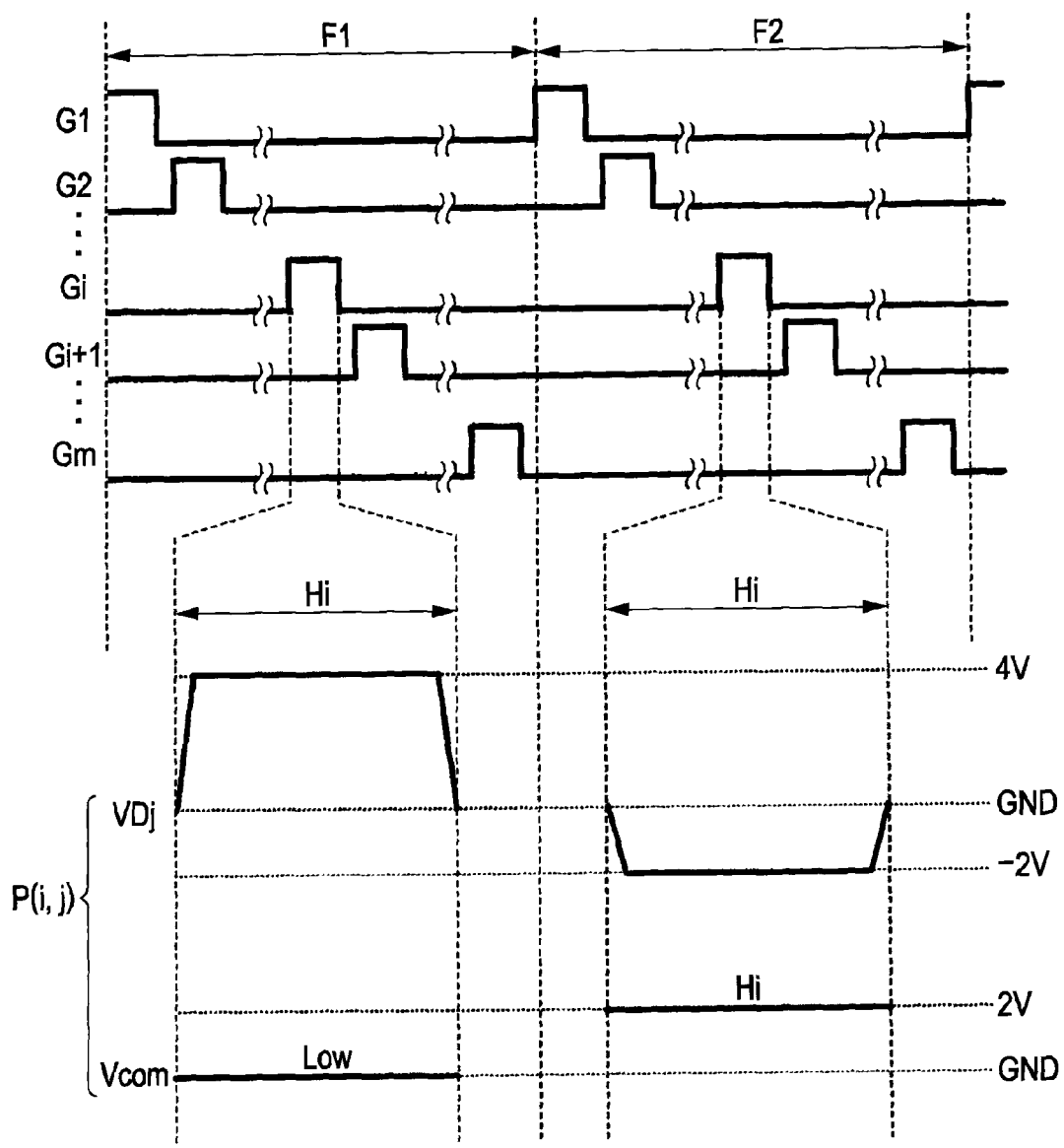
FIG. 10 is a timing chart that schematically illustrates an example of the image-displaying operation of an electro-optical device according to the first embodiment of the invention.

FIG. 10 is a timing chart that schematically illustrates an example of the image-displaying operation of the electro-optical device 10 according to the present embodiment of the invention. In the following description of the operation of the electro-optical device 10 according to the present embodiment of the invention, it is assumed that liquid crystal is AC driven with the use of a V reverse method. As illustrated in FIG. 10, the scanning signal Gi is set at a high level throughout the i-th horizontal scanning period Hi during a first frame period F1. As the level of the scanning signal Gi is set high, the transistor 51 of the pixel circuit P (i, j) turns ON. Accordingly, the data electric potential VDj whose voltage level is 4V is applied to the pixel electrode 53 via the data line 104 of the j-th column. On the other hand, the common electric potential Vcom that is set at the low level (GND) is applied to the common electrode 55 of all pixel circuits P that include the pixel circuit P (i, j) throughout the first frame period F1. Therefore, when it is assumed that the electric potential level (GND) of the common electrode 55 is taken as a reference, the electric potential level (4V) of the pixel electrode 53 constitutes a high potential throughout the first frame period F1. In addition, a voltage of 4V is applied between the common electrode 55 and the pixel electrode 53 of the pixel circuit P (i, j).

If the same color as that shown in the current frame is to be displayed in the next frame, it is necessary to continue the application of a voltage of 4V between the common electrode 55 and the pixel electrode 53 of the pixel circuit P (i, j) therein. In addition, it is necessary to invert the polarity of a voltage that is applied to the liquid crystal 57 of the pixel circuit P (i, j) in the next frame. As illustrated in FIG. 10, the common electric potential Vcom that is set at the high level (2V) is applied to the common electrode 55 of all pixel circuits P that include the pixel circuit P (i, j) throughout a second frame period F2 that follows the first frame period F1. Therefore, when the scanning signal Gi is set at a high level throughout the i-th horizontal scanning period Hi during the second frame period F2, the data electric potential VDj whose voltage level is −2V is applied to the pixel electrode 53 of the pixel circuit P (i, j).

Figure 11:
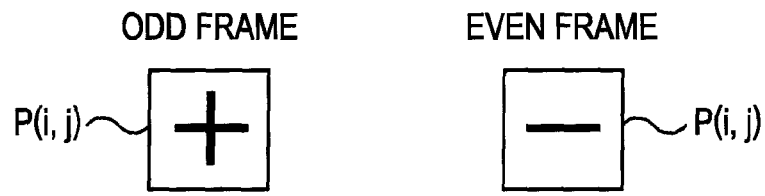
FIG. 11 is a diagram that schematically illustrates an example of the relationship between a frame period and the polarity of a voltage that is applied to liquid crystal according to the first embodiment of the invention.

Herein, it is defined that the polarity of a voltage that is applied to the liquid crystal 57 when the level of the electric potential of the pixel electrode 53 is higher than that of the common electrode 55 is "positive", whereas it is defined that the polarity of a voltage that is applied to the liquid crystal 57 when the level of the electric potential of the pixel electrode 53 is lower than that of the common electrode 55 is "negative". Under these definitions, as illustrated in FIG. 11, the polarity of a voltage that is applied to the liquid crystal 57 of the pixel circuit P (i, j) is positive (+) in odd frames, whereas the polarity of a voltage that is applied to the liquid crystal 57 of the pixel circuit P (i, j) is negative (+) in even frames. In addition, in the V reverse method, the polarity of a voltage that is applied to the liquid crystal 57 is the same among all pixel circuits P in the same single frame. The polarity of a voltage applied is reversed when it transitions from one frame to the next frame, where these two frames are adjacent to each other when viewed in time series.

Figure 12:
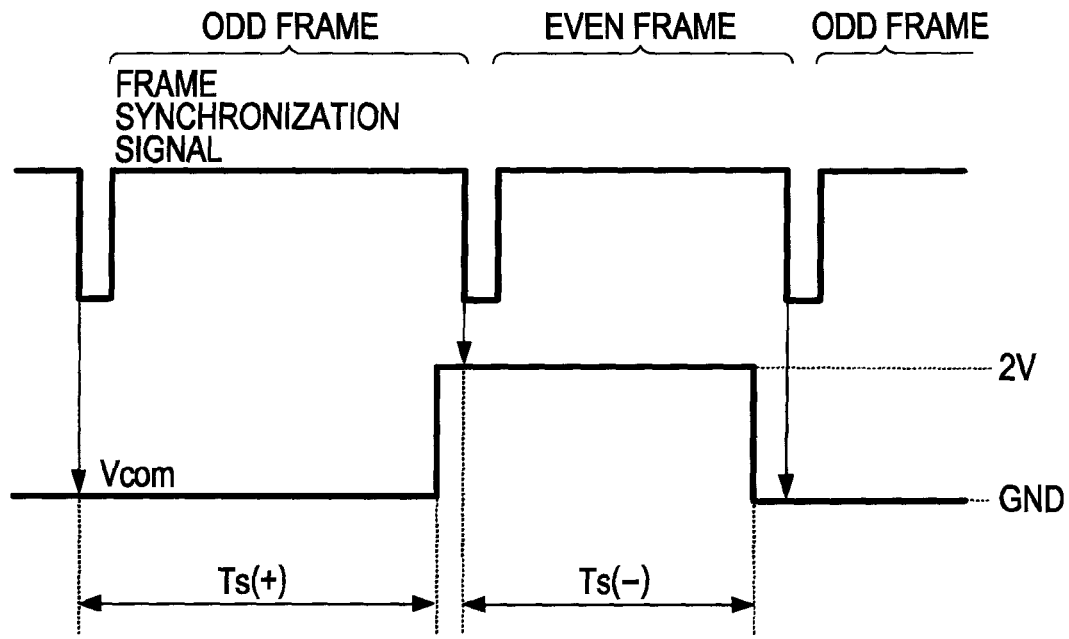
FIG. 12 is a timing chart that schematically illustrates an example of a time period in which capacitance values are detected for one screen according to the first embodiment of the invention.

FIG. 12 is a timing chart that schematically illustrates an example of a time period in which capacitance values are detected for one screen according to the present embodiment of the invention. The control circuit 200 drives each sensing circuit 60 via the detection circuit 40. Under the sensor driving control operation of the control circuit 200, the detection circuit 40 can obtain m×n/3 capacitance values for one screen when the common electric potential Vcom is at the low level and m×n/3 capacitance values for one screen when the common electric potential Vcom is at the high level. A time period throughout which the detection circuit 40 detects m×n×3 capacitance values for one screen when the common electric potential Vcom is at the low level is denoted as Ts (+) in FIG. 12. That is, the detection circuit 40 detects capacitance values for one screen when the common voltage level Vcom is low throughout a time period that starts at a point in time at which the level of the common electric potential Vcom is detected as low at a falling edge of a frame synchronization signal and ends immediately before a point in time at which the common electric potential Vcom is switched over to the high level. On the other hand, a time period throughout which the detection circuit 40 detects m×n×3 capacitance values for one screen when the common electric potential Vcom is at the high level is denoted as Ts (−) in FIG. 12. That is, the detection circuit 40 detects capacitance values for one screen when the common voltage level Vcom is high throughout a time period that starts at a point in time at which the level of the common electric potential Vcom is detected as high at a falling edge of the frame synchronization signal and ends immediately before a point in time at which the common electric potential Vcom is switched over to the low level. Note that the control circuit 200 judges whether the common electric potential Vcom that is being applied to the common electrode 55 is a high level or a low level at the timing of the falling of the level of the frame synchronization signal on the basis of the detection signal Vdet outputted from the Vcom detection circuit 400.

Next, the touch-judgment operation of the electro-optical device 10 according to the present embodiment of the invention is explained below. Upon the start of initialization processing illustrated in FIG. 13A, as a first step thereof, the control circuit 200 controls the detection circuit 40 and each of the plurality of sensing circuits 60 so as to detect m×n/3 capacitance values for one screen under a common low state in which the common electric potential Vcom is at a low level (e.g., GND). Then, the control circuit 200 stores the detected capacitance values for one screen under the common low state as first reference capacitance data in a first memory unit. The first memory unit, which is not illustrated in the drawing, is provided inside the control circuit 200. The detection of the capacitance values for one screen under the common low state and the memorizing thereof as the first reference capacitance data in the first memory unit are performed as a step S101 of the initialization processing. In the step S101, the capacitance values for one screen are detected during the time period Ts (+) of the odd frame illustrated in FIG. 12.

A more detailed explanation of the processing performed in the step S101 is given below. At a point in time at which the level of the frame synchronization signal falls, the control circuit 200 detects whether the common electric potential Vcom that is being applied to the common electrode 55 is a high level or a low level. Then, if the control circuit 200 judges that the common electric potential Vcom that is being applied to the common electrode 55 is a low level, the control circuit 200 outputs a detection start signal to the detection circuit 40. Upon receiving the detection start signal from the control circuit 200, the detection circuit 40 generates a reset signal RES and a selection signal SEL and supplies the generated signals to each sensing circuit 60. By this means, the detection circuit 40 causes each sensing circuit 60 to perform reset operation, sensing operation, and readout operation in a sequential manner, As a result, each sensing circuit 60 outputs a detection electric current It as a detection signal T to the detection circuit 40. The level of the detection signal T that is outputted from the sensing circuit 60 corresponds to the capacitance value of the touch detection capacitance element Cl. The touch detection capacitance element Cl is made up of the first electrode 64, the second electrode 65, and the liquid crystal 57 to which an electric field that is generated between the first electrode 64 and the second electrode 65 is applied. The detection circuit 40 performs signal processing on the detection signal T outputted from each sensing circuit 60 so as to obtain a plurality of capacitance values. The number of the capacitance values obtained by the detection circuit 40 equals to m multiplied by n and divided by three (m×n/3) in total. Then, the detection circuit 40 outputs these m×n/3 capacitance values obtained in this way to the control circuit 200 as capacitance values for one screen. The control circuit 200 memorizes these m×n/3 capacitance values for one screen that have been supplied from the detection circuit 40 into the first memory unit as the first reference capacitance data.

As the next step of the initialization processing, the control circuit 200 controls the detection circuit 40 and each sensing circuit 60 so as to detect m×n/3 capacitance values for one screen under a common high state in which the common electric potential Vcom is at a high level (e.g., 2V). Then, the control circuit 200 stores the detected capacitance values for one screen under the common high state as second reference capacitance data in the first memory unit (step S102). In the step S102, the capacitance values for one screen are detected during the time period Ts (−) of the even frame illustrated in FIG. 12. A more detailed explanation of the processing performed in the step S102 is given below. At a point in time at which the level of the frame synchronization signal falls, the control circuit 200 detects whether the common electric potential Vcom that is being applied to the common electrode 55 is a high level or a low level. Then, if the control circuit 200 judges that the common electric potential Vcom that is being applied to the common electrode 55 is a high level, the control circuit 200 outputs a detection start signal to the detection circuit 40. Thereafter, the detection circuit 40 performs a series of processing so as to output m×n/3 capacitance values for one screen to the control circuit 200. Since the series of processing performed in this step is the same as that of the step S101 explained above except that the processing is performed for obtaining capacitance values under the common high condition in this step. For this reason, an explanation of the series of processing is not given here. Upon receiving m×n/3 capacitance values for one screen from the detection circuit 40, the control circuit 200 memorizes the received capacitance values into the first memory unit as the second reference capacitance data.

The first reference capacitance data (Vcom=Low) that is memorized in the first memory unit and the second reference capacitance data (Vcom=High) that is memorized in the first memory unit are used as a low/high set of reference capacitance values for one screen, which provides a basis of comparison when touch-judgment operation is performed. The initialization processing explained above is performed at each time when, for example, the electro-optical device 10 is powered ON. Or, the initialization processing explained above is performed when a user manipulates manual operation buttons so as to give instructions for starting the initialization processing. As another example, the initialization processing explained above is performed at each time when display images are switched over. Or, as still another example, the initialization processing explained above is performed at predetermined time intervals. Through the initialization processing explained above, the first reference capacitance data (Vcom=Low) and the second reference capacitance data (Vcom=High), each of which is detected under non-contact reference conditions in which a detection-target object such as a finger, a touch pen, or the like is not in contact with the surface of a screen, are memorized in the first memory unit.

Figure 13A:
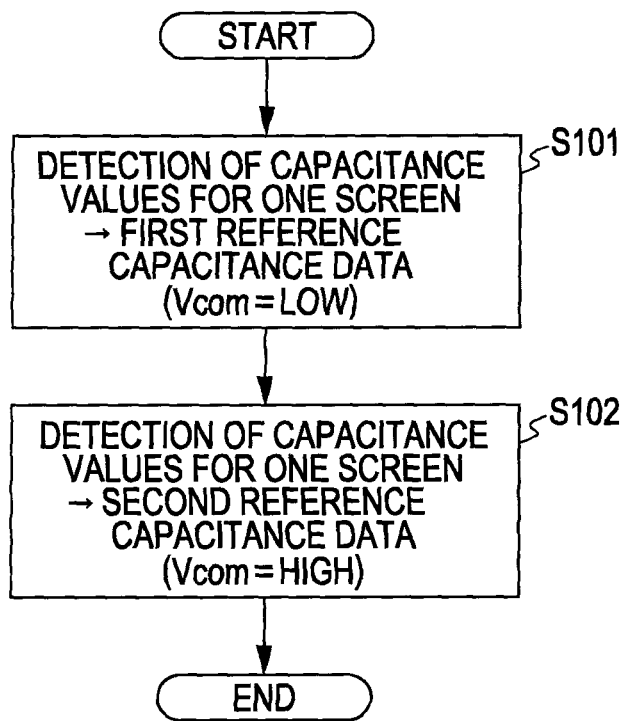
FIG. 13 is a set of flowcharts that schematically illustrates an example of processing performed by an electro-optical device according to the first embodiment of the invention; more specifically, FIG. 13A schematically illustrates an example of initialization processing according to the first embodiment of the invention whereas FIG. 13B schematically illustrates an example of touch-judgment processing according to the first embodiment of the invention.
Figure 13B:
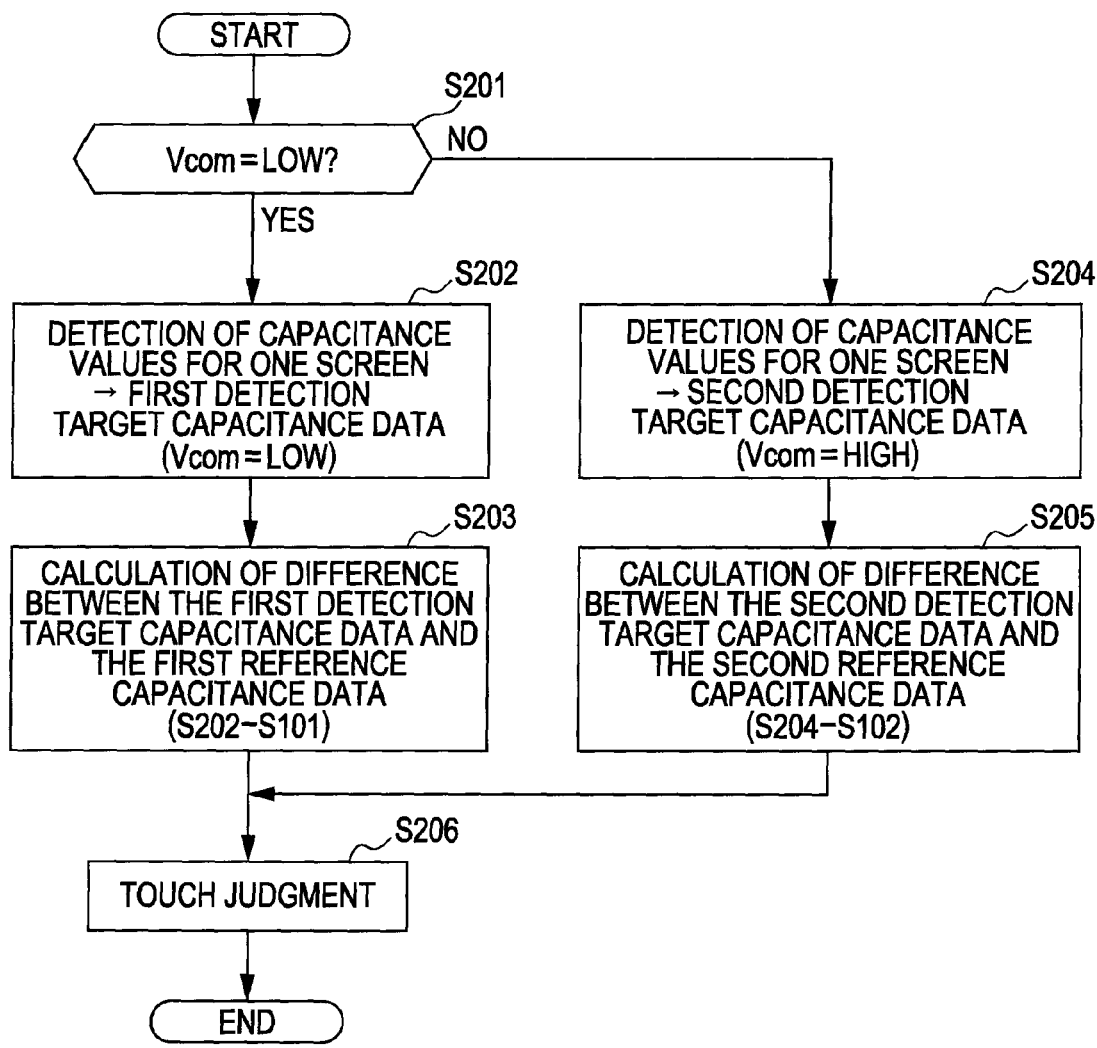

Next, touch-judgment processing illustrated in FIG. 13B is explained below. The touch-judgment processing is performed periodically when a touch input function is enabled, that is, set ON. That is, the touch-judgment processing is performed at regular intervals during a touch input time period in which a touch input by means of a finger, a touch pen, or the like is accepted. Upon the start of the touch-judgment processing illustrated in FIG. 13B, as a first step thereof, the control circuit 200 judges whether the common electric potential Vcom that is being applied to the common electrode 55 is a low level or not at a point in time at which the level of the frame synchronization signal falls (step S201). If the control circuit 200 judges that the common electric potential Vcom that is being applied to the common electrode 55 is a low level (step S201: YES), the control circuit 200 controls the detection circuit 40 and each of the plurality of sensing circuits 60 so as to detect m×n/3 capacitance values for one screen under a common low state in which the common electric potential Vcom is at a low level, and then stores the detected capacitance values for one screen under the common low state as first detection target capacitance data in a second memory unit, which is not illustrated in the drawing (step S202). The second memory unit is provided inside the control circuit 200. Through the processing of the step S202, the capacitance values for one screen that are detected in touch input enabled conditions in which the touch input function is set ON are memorized in the second memory unit as the first detection target capacitance data (Vcom=Low).

Next, the control circuit 200 reads the first reference capacitance data out of the first memory unit and then calculates a difference between the first detection target capacitance data that was detected in the preceding step S202 and the readout first reference capacitance data (step S203). The first reference capacitance data are m×n/3 capacitance values for one screen detected under the common low state in which the common electric potential Vcom is at the low level. The first detection target capacitance data are also m×n/3 capacitance values for one screen detected under the common low state in which the common electric potential Vcom is at the low level. When the difference between the first detection target capacitance data and the first reference capacitance data is calculated, for each of the m×n/3 capacitance values for one screen, a comparison is made on a sensing-circuit-by-sensing circuit basis. That is, a capacitance value that was detected by a certain sensing circuit 60 for acquiring the first reference capacitance data is compared with a capacitance value detected by the same sensing circuit 60 for acquiring the first detection target capacitance data. Since a comparison is made for each of the capacitance values for one screen, m×n/3 differences are calculated as difference data.

On the other hand, if the control circuit 200 judges that the common electric potential Vcom that is being applied to the common electrode 55 is not a low level (step S201: NO), that is, if the common electric potential Vcom that is being applied to the common electrode 55 is judged as a high level, the control circuit 200 controls the detection circuit 40 and each of the plurality of sensing circuits 60 so as to detect m×n/3 capacitance values for one screen under a common high state in which the common electric potential Vcom is at a high level, and then stores the detected capacitance values for one screen under the common high state as second detection target capacitance data in the second memory unit (step S204). Through the processing of the step S204, the capacitance values for one screen that are detected in touch input enabled conditions in which the touch input function is set ON are memorized in the second memory unit as the second detection target capacitance data (Vcom=High).

Next, the control circuit 200 reads the second reference capacitance data out of the first memory unit and then calculates a difference between the second detection target capacitance data that was detected in the preceding step S204 and the readout second reference capacitance data (step S205). The second reference capacitance data are m×n/3 capacitance values for one screen detected under the common high state in which the common electric potential Vcom is at the high level. The second detection target capacitance data are also m×n/3 capacitance values for one screen detected under the common high state in which the common electric potential Vcom is at the high level. When the difference between the second detection target capacitance data and the second reference capacitance data is calculated, for each of the m×n/3 capacitance values for one screen, a comparison is made on a sensing-circuit-by-sensing circuit basis. That is, a capacitance value that was detected by a certain sensing circuit 60 for acquiring the second reference capacitance data is compared with a capacitance value detected by the same sensing circuit 60 for acquiring the second detection target capacitance data. Since a comparison is made for each of the capacitance values for one screen, m×n/3 differences are calculated as difference data.

Thereafter, the control circuit 200 compares each of the m×n/3 calculated difference values of the difference data and a predetermined touch judgment threshold value. On the basis of the results of comparison, the control circuit 200 judges whether a user has now touched on a screen with a detection target object such as a finger, a touch pen, or the like or not (step S206). For example, the control circuit 200 counts the number of the difference values that are greater than the threshold value. If the counted number thereof is greater than, or at least equal to, a predetermined judgment value, the control circuit 200 judges that the screen is touched. If the counted number thereof is not greater than the predetermined judgment value, the control circuit 200 judges that the screen is not touched. Or, as another example, a judgment may be made as follows. An upper limit value and a lower limit value are preset on the number of the difference values that exceed the threshold value on the basis of the contact area of a detection target object such as a finger, a touch pen, or the like on a screen and further on the basis of the array density of the sensing circuits 60 in the screen. If the counted number of the difference values explained above falls within a range from the lower limit value to the upper limit value, the control circuit 200 judges that the screen is touched. If the counted number of the difference values explained above does not fall within a range from the lower limit value to the upper limit value, the control circuit 200 judges that the screen is not touched.

Figure 14:
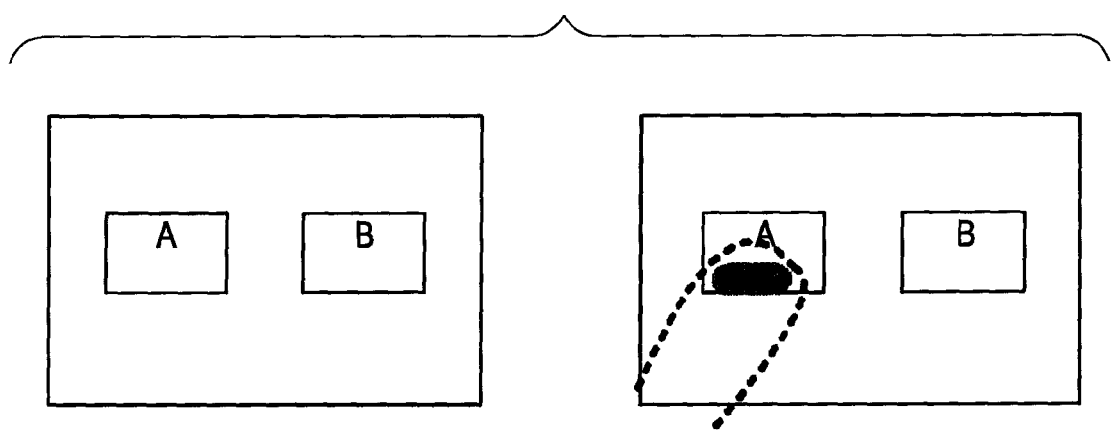
FIG. 14 is a set of diagrams the left part of which schematically illustrates an example of a screen state when reference capacitance data according to the first embodiment of the invention is detected and the right part of which schematically illustrates an example of a screen state when detection target capacitance data according to the first embodiment of the invention is detected.

The initialization processing illustrated in FIG. 13A is performed at the time when, for example, display images are switched over. The left part of FIG. 14 illustrates an example of a display state immediately after a display-image switchover. Specifically, the left part of FIG. 14 shows that a button A and a button B have now appeared on a display screen. The initialization processing illustrated in FIG. 13A is performed at such a point in time, though not limited thereto. A detection target object such as a finger, a touch pen, or the like is not in contact with the surface of a screen at this timing. Accordingly, the first reference capacitance data (Vcom=Low) and the second reference capacitance data (Vcom=High) are detected and then memorized in the first memory unit. Thereafter, the touch-judgment processing illustrated in FIG. 13B is performed at regular intervals. When a detection target object such as a finger, a touch pen, or the like is not in contact with the surface of a screen, each of difference values between the first detection target capacitance data (Vcom=Low) acquired in the touch-judgment processing and the first reference capacitance data (Vcom=Low) read out therein is not greater than the threshold value. Or, each of difference values between the second detection target capacitance data (Vcom=High) acquired in the touch-judgment processing and the second reference capacitance data (Vcom=High) read out therein is not greater than the threshold value. For this reason, the control circuit 200 judges that the screen is not touched.

In contrast, when a detection target object such as a finger, a touch pen, or the like is in contact with the surface of a screen as illustrated in the right part of FIG. 14, the capacitance value of the touch detection capacitance element Cl changes significantly at the hatched area part of the button A due to the contact of the detection target object thereat. Therefore, a plurality of difference data values that are greater than the threshold value is detected as a result of a comparison made between the first detection target capacitance data (Vcom=Low) and the first reference capacitance data (Vcom=Low) or between the second detection target capacitance data (Vcom=High) and the second reference capacitance data (Vcom=High) in the touch-judgment processing. For this reason, the control circuit 200 judges that the screen is touched.

As explained in detail above, in the operation of the electro-optical device 10 according to the present embodiment of the invention, it is possible to ensure that the driving state of liquid crystal (i.e., Vcom level) at the time of the acquisition of the reference capacitance data is the same as the driving state of liquid crystal at the time of the acquisition of the detection target capacitance data for a reliable comparison of the detection target capacitance data with the reference capacitance data when making a touch judgment. If a difference in the driving state of liquid crystal is not taken into consideration at all, it is not guaranteed that the driving state of liquid crystal at the time of the acquisition of the reference capacitance data is the same as the driving state of liquid crystal at the time of the acquisition of the detection target capacitance data. In such a case, the driving state of liquid crystal at the time of the acquisition of the detection target capacitance data could be different from the driving state of liquid crystal at the time of the acquisition of the reference capacitance data. If the driving state of liquid crystal at the time of the acquisition of the detection target capacitance data is different from the driving state of liquid crystal at the time of the acquisition of the reference capacitance data, the capacitance value of the touch detection capacitance element Cl varies when it is not supposed to because of a difference in Vcom levels therebetween (i.e., because of variations in the level of the common voltage Vcom). Therefore, it is difficult to obtain an accurate touch judgment result when the detection target capacitance data is compared with the reference capacitance data. In contrast, in the operation of the electro-optical device 10 according to the present embodiment of the invention, it is ensured that the driving state of liquid crystal (i.e., Vcom level) at the time of the acquisition of the reference capacitance data is the same as the driving state of liquid crystal at the time of the acquisition of the detection target capacitance data. Therefore, it is possible to eliminate variations in the capacitance value of the touch detection capacitance element Cl that are caused by a difference between the driving state of liquid crystal at the time of the acquisition of the reference capacitance data and the driving state of liquid crystal at the time of the acquisition of the detection target capacitance data. For this reason, it is possible to make a touch judgment with high accuracy.

B: Second Embodiment

Next, with reference to FIG. 15, an electro-optical device according to a second embodiment of the invention is explained below. The basic configuration of an electro-optical device according to the present embodiment of the invention is substantially the same as that of the electro-optical device 10 according to the first embodiment of the invention, which is explained above while referring to FIGS. 1-12. Accordingly, in the following description of this specification, the same reference numerals are consistently used for the same components as those described in the first embodiment of the invention. Note that redundant explanation will not be given for the components of an electro-optical device according to the second embodiment of the invention that are the same as those of the electro-optical device 10 according to the first embodiment of the invention.

Figure 15A:
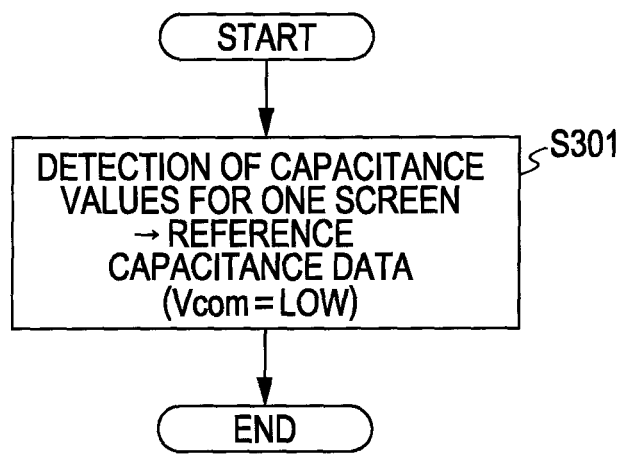
FIG. 15 is a set of flowcharts that schematically illustrates an example of processing performed by an electro-optical device according to a second embodiment of the invention; more specifically, FIG. 15A schematically illustrates an example of initialization processing according to the second embodiment of the invention whereas FIG. 15B schematically illustrates an example of touch-judgment processing according to the second embodiment of the invention.

Upon the start of initialization processing illustrated in FIG. 15A, the control circuit 200 controls the detection circuit 40 and each sensing circuit 60 so as to detect m×n/3 capacitance values for one screen under a common low state in which the common electric potential Vcom is at a low level. Then, the control circuit 200 stores the detected capacitance values for one screen under the common low state as reference capacitance data in the first memory unit (step S301). The step S301 of the initialization processing according to the second embodiment of the invention described here corresponds to the step S101 of the initialization processing according to the first embodiment of the invention described above.

In the initialization processing according to the foregoing first embodiment of the invention, both the capacitance values for one screen under the common low state in which the common electric potential Vcom is at the low level (i.e., the first reference capacitance data) and the capacitance values for one screen under the common high state in which the common electric potential Vcom is at the high level (i.e., the second reference capacitance data) are detected and then memorized in the first memory unit. In contrast, in the initialization processing according to the second embodiment of the invention, the capacitance values for one screen under the common low state only in which the common electric potential Vcom is at the low level are detected and then memorized as the reference capacitance data in the first memory unit. As is the case with the initialization processing according to the foregoing first embodiment of the invention, the initialization processing illustrated in FIG. 15A is performed at each time when, for example, the electro-optical device is powered ON. Or, the initialization processing illustrated in FIG. 15A is performed when a user manipulates manual operation buttons so as to give instructions for starting the initialization processing. As another example, the initialization processing illustrated in FIG. 15A is performed at each time when display images are switched over. Or, as still another example, the initialization processing illustrated in FIG. 15A is performed at predetermined time intervals. Through the initialization processing explained above, capacitance values for one screen (Vcom=Low) that are detected under non-contact reference conditions in which a detection-target object such as a finger, a touch pen, or the like is not in contact with the surface of a screen are memorized in the first memory unit as the reference capacitance data.

Next, touch-judgment processing illustrated in FIG. 15B is performed periodically when a touch input function is set ON. Upon the start of the touch-judgment processing illustrated in FIG. 15B, as a first step thereof, the control circuit 200 judges whether the common electric potential Vcom that is being applied to the common electrode 55 is a low level or not at a point in time at which the level of a frame synchronization signal falls (step S401). If the result of the judgment is NO, the control circuit 200 repeats this judgment step of S401 until it is judged that the common electric potential Vcom has turned low. If the control circuit 200 judges that the common electric potential Vcom that is being applied to the common electrode 55 is a low level or has turned to the low level (step S401: YES), the control circuit 200 controls the detection circuit 40 and each of the plurality of sensing circuits 60 so as to detect m×n/3 capacitance values for one screen under the common low state in which the common electric potential Vcom is at the low level, and then stores the detected capacitance values for one screen under the common low state as detection target capacitance data in the second memory unit (step S402). Through the processing of the step S402, the capacitance values for one screen that are detected in touch input enabled conditions in which the touch input function is set ON are memorized in the second memory unit as the detection target capacitance data (Vcom Low).

Next, the control circuit 200 reads the reference capacitance data out of the first memory unit and then calculates a difference between the detection target capacitance data that was detected in the preceding step S402 and the readout reference capacitance data (step S403). The reference capacitance data are m×n/3 capacitance values for one screen detected under the common low state in which the common electric potential Vcom is at the low level. The detection target capacitance data are also m×n/3 capacitance values for one screen detected under the common low state in which the common electric potential Vcom is at the low level. When the difference between the detection target capacitance data and the reference capacitance data is calculated, for each of the m×n/3 capacitance values for one screen, a comparison is made on a sensing-circuit-by-sensing circuit basis. That is, a capacitance value that was detected by a certain sensing circuit 60 for acquiring the reference capacitance data is compared with a capacitance value detected by the same sensing circuit 60 for acquiring the detection target capacitance data. Since a comparison is made for each of the capacitance values for one screen, m×n/3 differences are calculated as difference data. Thereafter, the control circuit 200 compares each of the m×n/3 calculated difference values of the difference data and a predetermined touch judgment threshold value. On the basis of the results of comparison, the control circuit 200 judges whether a user has now touched on a screen with a detection target object or not (step S404).

In the configuration and operation of an electro-optical device according to the present embodiment of the invention, it suffices to memorize the capacitance values for one screen detected under the common low state only in which the common electric potential Vcom is at the low level as the reference capacitance data. That is, it is not necessary to memorize the capacitance values for one screen detected under the common high state in which the common electric potential Vcom is at the high level. Accordingly, it is possible to reduce the memory capacity of the first memory unit by half in comparison with the memory capacity of the first memory unit according to the foregoing first embodiment of the invention. In the description of the second embodiment of the invention, it is explained that each of the reference capacitance data and the detection target capacitance data is detected during a common low time period in which the common electric potential Vcom is at the low level. Then, touch-judgment operation is performed on the basis of the calculated differences between the detection target capacitance data acquired in the common low time period and the reference capacitance data acquired in the common low time period. However, the scope of this aspect of the invention is not limited to such an exemplary configuration. For example, each of the reference capacitance data and the detection target capacitance data may be detected during a common high time period in which the common electric potential Vcom is at the high level. In such a modified configuration/operation, touch-judgment operation is performed on the basis of the calculated differences between the detection target capacitance data acquired in the common high time period and the reference capacitance data acquired in the common high time period.

C: Third Embodiment

Next, with reference to FIG. 16, an electro-optical device according to a third embodiment of the invention is explained below. The basic configuration of an electro-optical device according to the present embodiment of the invention is substantially the same as that of the electro-optical device 10 according to the first embodiment of the invention, which is explained above while referring to FIGS. 1-12. Accordingly, in the following description of this specification, the same reference numerals are consistently used for the same components as those described in the first embodiment of the invention. Note that redundant explanation will not be given for the components of an electro-optical device according to the third embodiment of the invention that are the same as those of the electro-optical device 10 according to the first embodiment of the invention.

Upon the start of initialization processing illustrated in FIG. 16A, as a first step thereof, the control circuit 200 controls the detection circuit 40 and each sensing circuit 60 so as to detect m×n/3 capacitance values for one screen under a common low state in which the common electric potential Vcom is at a low level. Then, the control circuit 200 stores the detected capacitance values for one screen under the common low state as the first reference capacitance data in the first memory unit (step S501). As the next step of the initialization processing, the control circuit 200 controls the detection circuit 40 and each sensing circuit 60 so as to detect m×n/3 capacitance values for one screen under a common high state in which the common electric potential Vcom is at a high level. Then, the control circuit 200 stores the detected capacitance values for one screen under the common high state as the second reference capacitance data in the first memory unit (step S502). The steps S501 and S502 of the initialization processing according to the third embodiment of the invention described here are the same as the steps S101 and S102 of the initialization processing according to the first embodiment of the invention described above, respectively.

Next, the control circuit 200 acquires average value data by calculating the average values of the first reference capacitance data and the second reference capacitance data. Then, the control circuit 200 stores the calculated average values in the first memory unit as the reference capacitance data. The calculation of the average values of the first reference capacitance data and the second reference capacitance data and the memorizing of the calculation result as the reference capacitance data in the first memory unit are performed as a step S503 of the initialization processing. The first reference capacitance data are m×n/3 capacitance values for one screen detected under the common low state in which the common electric potential Vcom is at the low level. On the other hand, the second reference capacitance data are m×n/3 capacitance values for one screen detected under the common high state in which the common electric potential Vcom is at the high level. When the average values of the first reference capacitance data and the second reference capacitance data are calculated, for each of the m×n/3 capacitance values for one screen, averaging processing is performed on a sensing-circuit-by-sensing circuit basis. That is, a capacitance value that was detected by a certain sensing circuit 60 for acquiring the first reference capacitance data and a capacitance value detected by the same sensing circuit 60 for acquiring the second reference capacitance data are subjected to averaging. Since averaging processing is performed for each of the capacitance values for one screen, m×n/3 averages are calculated as the average value data.

As is the case with the initialization processing according to the foregoing first embodiment of the invention, the initialization processing illustrated in FIG. 16A is performed at each time when, for example, the electro-optical device is powered ON. Or, the initialization processing illustrated in FIG. 16A is performed when a user manipulates manual operation buttons so as to give instructions for starting the initialization processing. As another example, the initialization processing illustrated in FIG. 16A is performed at each time when display images are switched over. Or, as still another example, the initialization processing illustrated in FIG. 16A is performed at predetermined time intervals. Through the initialization processing explained above, the capacitance values for one screen (the number of which is m×n/3) that have been subjected to averaging under non-contact reference conditions in which a detection-target object such as a finger, a touch pen, or the like is not in contact with the surface of a screen are memorized in the first memory unit as the reference capacitance data.

Next, touch-judgment processing illustrated in FIG. 16B is performed periodically when a touch input function is set ON. Upon the start of the touch-judgment processing illustrated in FIG. 16B, as a first step thereof, the control circuit 200 controls the detection circuit 40 and each of the plurality of sensing circuits 60 so as to detect m×n/3 capacitance values for one screen under the common low state in which the common electric potential Vcom is at the low level, and then stores the detected capacitance values for one screen under the common low state as the first detection target capacitance data in the second memory unit (step S601). As the next step of the touch-judgment processing, the control circuit 200 controls the detection circuit 40 and each of the plurality of sensing circuits 60 so as to detect m×n/3 capacitance values for one screen under the common high state in which the common electric potential Vcom is at the high level, and then stores the detected capacitance values for one screen under the common high state as the second detection target capacitance data in the second memory unit (step S602).

Next, the control circuit 200 acquires average value data by calculating the average values of the first detection target capacitance data and the second detection target capacitance data. Then, the control circuit 200 stores the calculated average values in the second memory unit as the detection target capacitance data. The calculation of the average values of the first detection target capacitance data and the second detection target capacitance data and the memorizing of the calculation result as the detection target capacitance data in the second memory unit are performed as a step S603 of the touch-judgment processing. The first detection target capacitance data are m×n/3 capacitance values for one screen detected under the common low state in which the common electric potential Vcom is at the low level. On the other hand, the second detection target capacitance data are m×n/3 capacitance values for one screen detected under the common high state in which the common electric potential Vcom is at the high level. When the average values of the first detection target capacitance data and the second detection target capacitance data are calculated, for each of the m×n/3 capacitance values for one screen, averaging processing is performed on a sensing-circuit-by-sensing circuit basis. That is, a capacitance value that was detected by a certain sensing circuit 60 for acquiring the first detection target capacitance data and a capacitance value detected by the same sensing circuit 60 for acquiring the second detection target capacitance data are subjected to averaging. Since averaging processing is performed for each of the capacitance values for one screen, m×n/3 averages are calculated as the average value data. Through the processing of the step S603, the average values for one screen (the number of which is m×n/3) that are detected in the touch input enabled conditions in which the touch input function is set ON are memorized in the second memory unit as the detection target capacitance data.

Next, the control circuit 200 reads the reference capacitance data out of the first memory unit and then calculates a difference between the detection target capacitance data that was calculated in the preceding step S603 and the readout reference capacitance data (step S604). The reference capacitance data are the average values of the first reference capacitance data and the second reference capacitance data. The number of the average values thereof is m×n/3. The detection target capacitance data are the average values of the first detection target capacitance data and the second detection target capacitance data. The number of the average values thereof is m×n/3. When the difference between the average values of the first reference capacitance data and the second reference capacitance data and the average values of the first detection target capacitance data and the second detection target capacitance data is calculated, for each of the m×n/3 average data values (i.e., capacitance values) for one screen, a comparison is made on a sensing-circuit-by-sensing circuit basis. That is, a capacitance value that was obtained by a certain sensing circuit 60 for acquiring the reference capacitance data is compared with a capacitance value obtained by the same sensing circuit 60 for acquiring the detection target capacitance data. Since a comparison is made for each of the capacitance values for one screen, m×n/3 differences are calculated as difference data. Thereafter, the control circuit 200 compares each of the m×n/3 calculated difference values of the difference data and a predetermined touch judgment threshold value. On the basis of the results of comparison, the control circuit 200 judges whether a user has now touched on a screen with a detection target object or not (step S605). For example, the control circuit 200 counts the number of the difference values that are greater than the threshold value. If the counted number thereof is greater than, or at least equal to, a predetermined judgment value, the control circuit 200 judges that the screen is touched. If the counted number thereof is not greater than the predetermined judgment value, the control circuit 200 judges that the screen is not touched.

The reference capacitance data according to the present embodiment of the invention are the average values of capacitance values for one screen when the common electric potential Vcom is at the low level and capacitance values for one screen when the common electric potential Vcom is at the high level. In like manner, the detection target capacitance data according to the present embodiment of the invention are the average values of capacitance values for one screen when the common electric potential Vcom is at the low level and capacitance values for one screen when the common electric potential Vcom is at the high level. In the operation of an electro-optical device according to the present embodiment of the invention, since the average of capacitance values for one screen when the common electric potential Vcom is at the low level and capacitance values for one screen when the common electric potential Vcom is at the high level is found for each of the reference capacitance data and the detection target capacitance data as explained above, it is possible to ensure the same extent of an influence on a touch judgment that is attributable to variations in the capacitance value of the touch detection capacitance element Cl that are caused by a difference in the driving state of liquid crystal (i.e., Vcom level). For this reason, it is possible to eliminate an influence on a touch judgment that is attributable to variations in the capacitance value of the touch detection capacitance element Cl that are caused by a difference in the driving state of liquid crystal simply by comparing the reference capacitance data and the detection target capacitance data. In addition, the averaging of capacitance values for one screen when the common electric potential Vcom is at the low level and capacitance values for one screen when the common electric potential Vcom is at the high level makes it possible to reduce noise. For this reason, it is possible to make a touch judgment with high accuracy.

If there is a large time interval between a point in time at which the first detection target capacitance data (Vcom=Low) is detected and a point in time at which the second detection target capacitance data (Vcom=High) is detected, a problem might arise in that, for example, one data is detected under non-contact conditions in which a detection-target object is not in contact with the surface of a screen whereas the other data is detected under contact conditions in which the detection-target object is in contact with the surface of the screen. Other state change that affects touch-judgment precision might occur due to the large time interval therebetween. In such a case, it is difficult to make an accurate touch judgment. In order to avoid such a difficulty, it is preferable to detect the first detection target capacitance data and the second detection target capacitance data in two adjacent time periods. For example, it is preferable to detect the first detection target capacitance data in an N-th frame and detect the second detection target capacitance data in an N+1-th frame, which is the frame immediately after the N-th frame. Then, an average (i.e., average values) of the first detection target capacitance data detected in the N-th frame and the second detection target capacitance data detected in the N+1-th frame is found. For similar reasons, when the first reference capacitance data (Vcom=Low) is detected in a certain frame, it is preferable to detect the second reference capacitance data (Vcom=High) in a frame that is adjacent to the certain frame mentioned above, or at least without a large time interval therebetween.

D: VARIATION EXAMPLES

The present invention is in no case limited to the specific embodiments described above. For example, the invention can be modified in a variety of ways, several examples of which are described below. Note that two or more of the following variation examples may be combined with each other or one another.

First Variation Example

In the foregoing description of the operation of an electro-optical device according to each exemplary embodiment of the invention, it is explained that the level of the common voltage Vcom alternates between high and low. In addition, it is explained that the common electric potential Vcom is inverted from the low/high potential to the high/low potential in a switched manner, where a Vcom level switchover occurs every one frame. However, the scope of this aspect of the invention is not limited to such an exemplary operation. For example, the level of the common voltage Vcom may be switched over between high and low at each lapse of a set of two frames, three frames, or the like. If an interlace scanning method is adopted, the level of the common voltage Vcom may be switched over between high and low at each time when, for example, one field, a set of four fields, or the like lapses.

Second Variation Example

In the foregoing description of the configuration of an electro-optical device according to each exemplary embodiment of the invention, it is explained that one sensing circuit 60 is provided for each set of pixel circuits C that is made up of three pixel circuits P corresponding to three display colors of R, G, and B. However, the scope of this aspect of the invention is not limited to such an exemplary configuration. For example, one sensing circuit 60 may be provided for each pixel circuit P. In such a modified configuration, the number of the sensing circuits 60 that are provided in the pixel area 100 is m×n in total. Or, as another modification example, assuming that each set of pixel circuits C is made up of three pixel circuits P corresponding to three display colors of R, G, and B, each sensing circuit 60 may be provided for two or more sets of pixel circuits C that are arrayed adjacent to each other or one another.

Third Variation Example

In the foregoing description of the operation of an electro-optical device according to each exemplary embodiment of the invention, it is explained that liquid crystal is AC driven with the use of a V reverse method. Notwithstanding the foregoing, however, the invention can be applied to an H reverse scheme or an S reverse scheme as a modification example thereof. In the H reverse method, the polarity of a voltage that is applied to the liquid crystal 57 is reversed every other scanning line 102 (i.e., row). In the S reverse method, the polarity of a voltage that is applied to the liquid crystal 57 is reversed every other data line 104 (i.e., column). Accordingly, when the H reverse method is adopted, the detection of reference capacitance data and detection target capacitance data can be performed as follows. The level of the common voltage Vcom at odd rows and the level of the common voltage Vcom at even rows are detected. For example, if the level of the common voltage Vcom detected at odd rows is low whereas the level of the common voltage Vcom detected at even rows is high, capacitance values obtained from all odd-row sensing circuits 60, that is, sensing circuits 60 that are provided at odd rows, are used as capacitance values for a screen detected under a common low state in which the common electric potential Vcom is at a low level. The number of the capacitance values obtained from all of the odd-row sensing circuits 60 is m×n/3/2. In addition, capacitance values obtained from all even-row sensing circuits 60, that is, sensing circuits 60 that are provided at even rows, are used as capacitance values for a screen detected under a common high state in which the common electric potential Vcom is at a high level. The number of the capacitance values obtained from all of the even-row sensing circuits 60 is m×n/3/2. On the other hand, when the S reverse method is adopted with one sensing circuit 60 being provided for each pixel circuit P, the detection of reference capacitance data and detection target capacitance data can be performed as follows. The level of the common voltage Vcom at odd columns and the level of the common voltage Vcom at even columns are detected. For example, if the level of the common voltage Vcom detected at odd columns is low whereas the level of the common voltage Vcom detected at even columns is high, capacitance values obtained from all odd-column sensing circuits 60, that is, sensing circuits 60 that are provided at odd columns, are used as capacitance values for a screen detected under a common low state in which the common electric potential Vcom is at a low level. The number of the capacitance values obtained from all of the odd-column sensing circuits 60 is m×n/2. In addition, capacitance values obtained from all even-column sensing circuits 60, that is, sensing circuits 60 that are provided at even columns, are used as capacitance values for a screen detected under a common high state in which the common electric potential Vcom is at a high level. The number of the capacitance values obtained from all of the even-column sensing circuits 60 is m×n/2.

Fourth Variation Example

Figure 17:
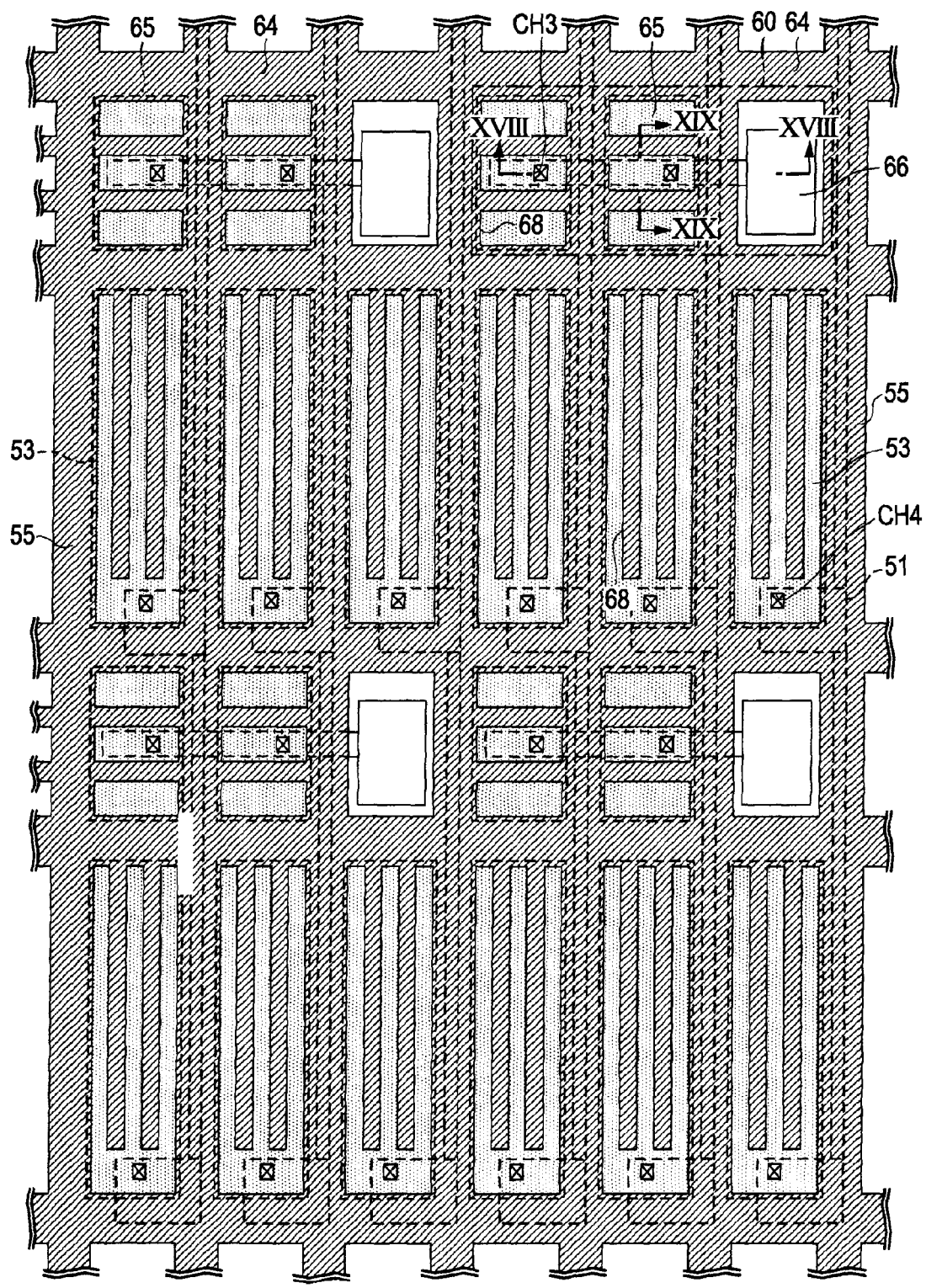
FIG. 17 is a plan view that schematically illustrates an example of the configuration of pixel circuits and sensing circuits according to a fourth variation example of the invention.

FIG. 17 is a plan view that schematically illustrates an example of the configuration of the pixel circuits P and the sensing circuits 60 according to a fourth variation example of the invention. In the configuration of the sensing circuit 60 according to the fourth variation example of the invention, the first electrode 64 and the second electrode 65 are formed on two layers that are different from each other. In addition, the first electrode 64 that is formed on one layer and the second electrode 65 that is formed on the other layer are arrayed in such a planar pattern that, for example, they partially overlap each other as two opposite electrodes. FIG. 18 is a sectional view taken along the line XVIII-XVIII of FIG. 17. As illustrated in FIG. 18, the second electrode 65 is formed on the surface of the third insulation layer Fa3. As in the configuration of the second electrode 65 according to the foregoing first embodiment of the invention, the second electrode 65 according to the fourth variation example described here is electrically connected to the electro-conductive layer 116 via the third contact hole CH3. A fourth insulation layer Fa4 covers the second electrode 65. The first electrode 64 is formed on the surface of the fourth insulation layer Fa4. The first electrode 64 and the second electrode 65 are arrayed in such a planar layout that, for example, they partially overlap each other as two opposite electrodes.

As illustrated in FIG. 17, a plurality of slits 68 is formed through the first electrode 64. The slit 68 is provided so that an electric field that is generated between the first electrode 64 and the second electrode 65 can pass therethrough. FIG. 19 is a sectional view taken along the line XIX-XIX of FIG. 17. The electric field that is generated between the first electrode 64 and the second electrode 65 is applied to the liquid crystal 57. As illustrated in FIG. 19, a plurality of capacitances Clm each of which is made up of the first electrode 64, the second electrode 65, and the liquid crystal 57 to which the electric field is applied is generated. The plurality of capacitances Clm constitutes the touch detection capacitance element Cl as in the configuration of the electro-optical device 10 according to the first embodiment of the invention.

As explained above, in the configuration of the sensing circuit 60 according to the fourth variation example of the invention, the first electrode 64 and the second electrode 65 are formed on two layers that are different from each other. In addition, the first electrode 64 that is formed on one layer and the second electrode 65 that is formed on the other layer are arrayed in such a planar pattern that, for example, they partially overlap each other as two opposite electrodes. With such a configuration, an electric field that is directed from the second electrode 65 to the first electrode 64 through the slit 68 contains a larger amount of electric field component that is perpendicular to the pair of substrates in comparison with that of an electric field generated by the sensing circuit 60 according to the first embodiment of the invention, which has the first electrode 64 and the second electrode 65 formed out of the same layer as the same-layer electrodes. In addition, an electric field that is directed from the first electrode 64 to the second electrode 65 through the slit 68 contains a larger amount of electric field component that is perpendicular to the pair of substrates in comparison with that of an electric field generated by the sensing circuit 60 according to the first embodiment of the invention, which has the first electrode 64 and the second electrode 65 formed out of the same layer as the same-layer electrodes. Since an electric field that is directed from the second electrode 65 to the first electrode 64 through the slit 68 or from the first electrode 64 to the second electrode 65 through the slit 68 contains a larger amount of electric field component that is perpendicular to the pair of substrates, the molecules of the liquid crystal 57 are slanted with a certain degree of inclination due to the electric field that is generated between the first electrode 64 and the second electrode 65 as compared with the orientation of the liquid crystal molecules according to the first embodiment of the invention. When a screen is depressed with the liquid crystal molecules being inclined, the alignment state of the liquid crystal molecules is easier to change in comparison with a case where the screen is depressed when the liquid crystal molecules is oriented substantially parallel to the substrates. For this reason, the sensing circuit 60 according to the fourth variation example of the invention makes it possible to increase the amount of change ΔVA in the gate electric potential VA of the amplification transistor 62 as the amount of change ΔClc in the capacitance value of the touch detection capacitance element Cl from a non-contact state in which the detection-target object is not in contact with the surface of the screen to a contact state in which the detection-target object is in contact with the surface of the screen increases. As the amount of change ΔVA in the gate electric potential VA of the amplification transistor 62 increases, so does the detection sensitivity of the sensing circuit 60.

As illustrated in FIG. 17, the first electrode 64 of the sensing circuit 60 and the common electrode 55 of the pixel circuit P are formed out of the same layer as defined above. In addition, the second electrode 65 of the sensing circuit 60 and the pixel electrode 53 of the pixel circuit P are formed out of the same layer as defined above. Therefore, as in the configuration of the electro-optical device 10 according to the first embodiment of the invention, it is possible to manufacture the sensing circuit 60 and the pixel circuit P in the same manufacturing process at the same time, which makes it easier to manufacture a liquid crystal panel.

Fifth Variation Example

Figure 20:
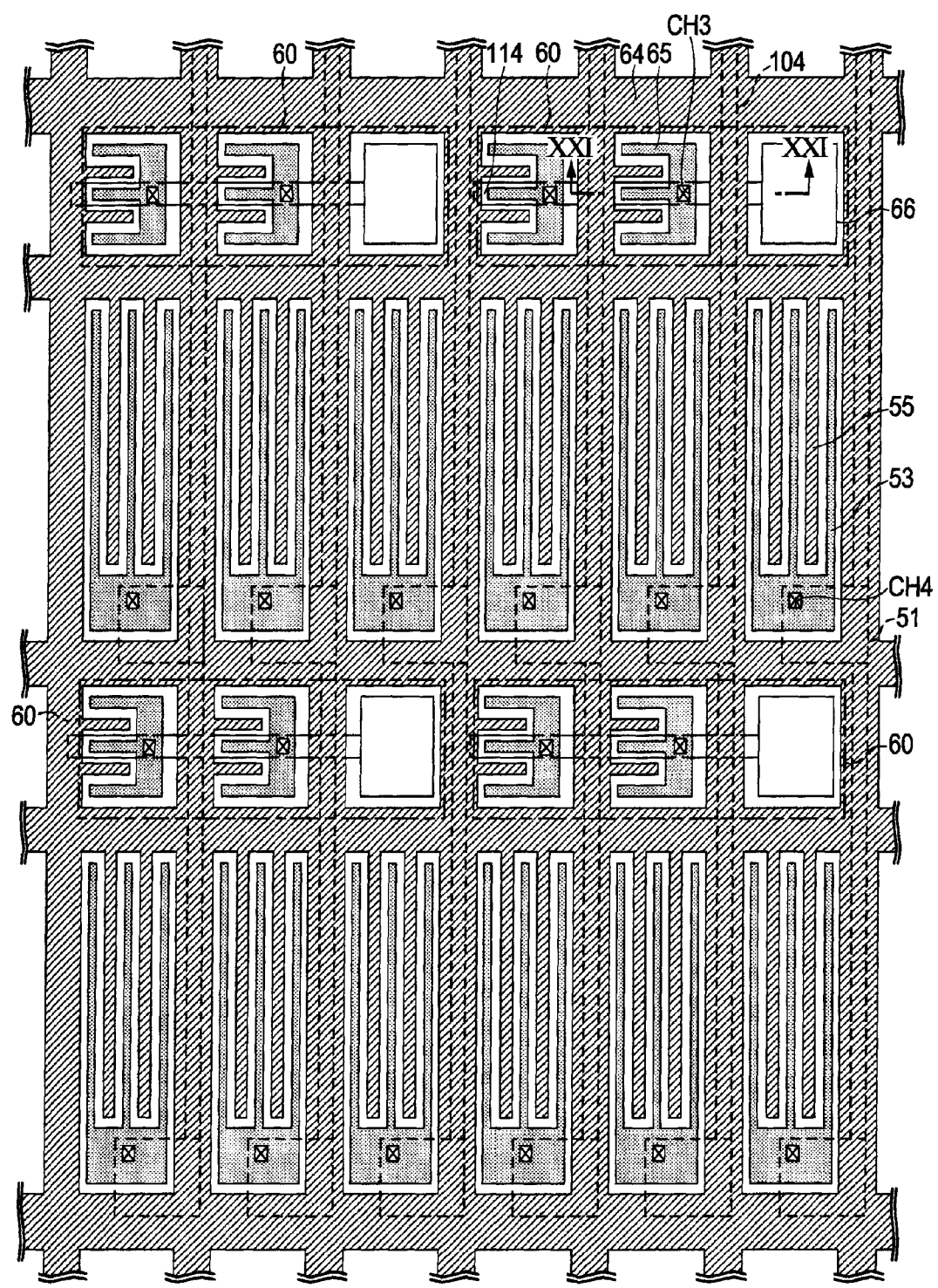
FIG. 20 is a plan view that schematically illustrates an example of the configuration of pixel circuits and sensing circuits according to a fifth variation example of the invention.

FIG. 20 is a plan view that schematically illustrates an example of the configuration of the pixel circuits P and the sensing circuits 60 according to a fifth variation example of the invention. The configuration of the sensing circuit 60 according to the fifth variation example of the invention and the configuration of the sensing circuit 60 according to the fourth variation example of the invention have an identical feature in that the first electrode 64 and the second electrode 65 are formed on two layers that are different from each other with the first electrode 64 being formed on one layer and the second electrode 65 being formed on the other layer. However, the configuration of the sensing circuit 60 according to the fifth variation example of the invention is different from that of the sensing circuit 60 according to the fourth variation example of the invention in the following points. The first electrode 64 according to the fifth variation example of the invention has a shape that resembles teeth of a comb. Each tooth of the first electrode 64 extends in one direction. The second electrode 65 according to the fifth variation example of the invention also has a shape that resembles teeth of a comb. Each tooth of the second electrode 65 extends in the other opposite direction. The teeth of the first-electrode comb according to the fifth variation example of the invention and the teeth of the second-electrode comb according to the fifth variation example of the invention are staggered as if they were in engagement with each other or filled gaps each other with a clearance being left therebetween when viewed in plan. In addition, the first electrode 64 according to the fifth variation example of the invention and the second electrode 65 according to the fifth variation example of the invention are arrayed in such an array pattern that they do not overlap each other at all when viewed in plan. These are the differences between the configuration of the sensing circuit 60 according to the fifth variation example of the invention and the configuration of the sensing circuit 60 according to the fourth variation example of the invention. Except for these differences, the basic configuration of an electro-optical device according to the fifth variation example of the invention is substantially the same as that of an electro-optical device according to the fourth variation example of the invention. Accordingly, in the following description of this specification, the same reference numerals are consistently used for the same components as those described in the fourth variation example of the invention. Note that redundant explanation will not be given for the components of an electro-optical device according to the fifth variation example of the invention that are the same as those of an electro-optical device according to the fourth variation example of the invention.

Figure 21:
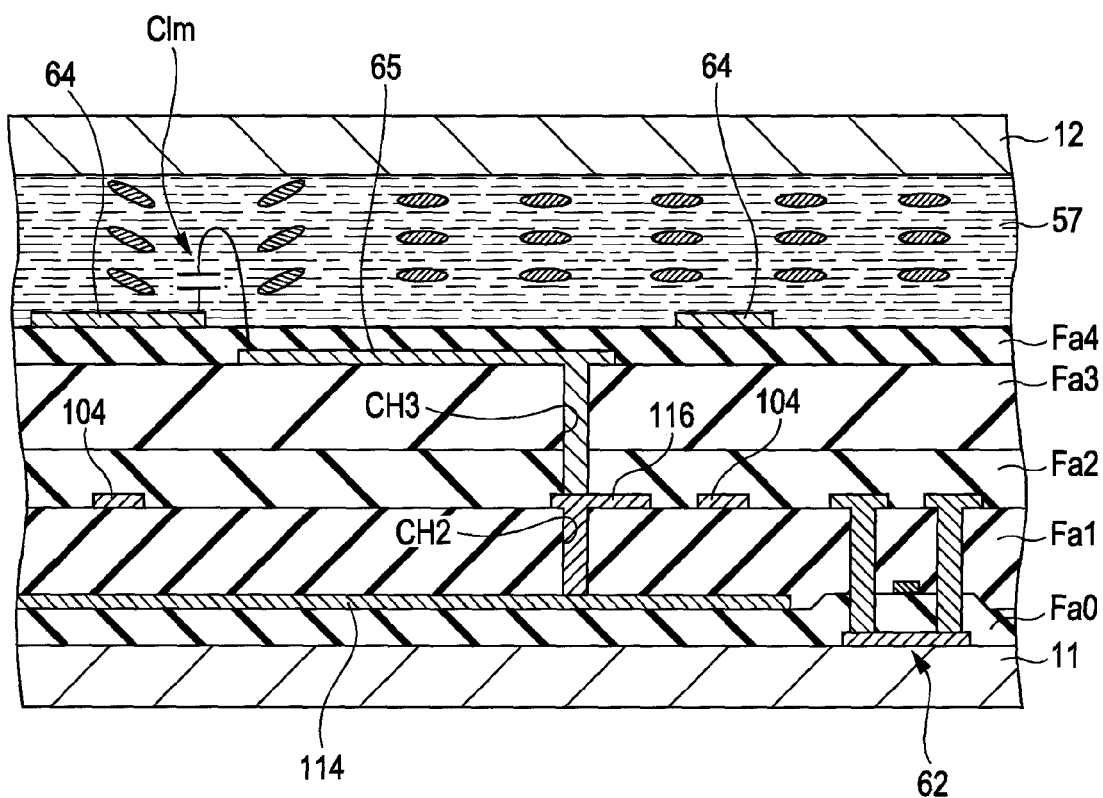
FIG. 21 is a sectional view taken along the line XXI-XXI of FIG. 20.

FIG. 21 is a sectional view taken along the line XXI-XXI of FIG. 20. In the configuration of the sensing circuit 60 according to the fifth variation example of the invention, the first electrode 64 and the second electrode 65 are arrayed in such an array layout that they do not overlap each other at all when viewed in plan. With such an array pattern, the area of electrodes that constitute the capacitance Clm is smaller in comparison with that of the sensing circuit 60 according to the fourth variation example of the invention. This means that the value of the capacitance Clm according to the fifth variation example of the invention is smaller than the value of the capacitance Clm according to the fourth variation example of the invention. As understood from the foregoing mathematical formula (1), as the capacitance value Clc of the touch detection capacitance element Cl becomes smaller, the amount of change ΔVA in the gate electric potential VA of the amplification transistor 62 between a non-contact state and a contact state increases, which makes it possible to increase the detection sensitivity of the sensing circuit 60.

As explained above, the first electrode 64 according to the fifth variation example of the invention has a shape that resembles teeth of a comb, each tooth of which extends in one direction. The second electrode 65 according to the fifth variation example of the invention also has a shape that resembles teeth of a comb, each tooth of which extends in the other opposite direction. The teeth of the first-electrode comb according to the fifth variation example of the invention and the teeth of the second-electrode comb according to the fifth variation example of the invention are staggered as if they were in engagement with each other or filled gaps each other with a clearance being left therebetween when viewed in plan. With such a staggered comb-teeth array pattern, it is possible to secure a relatively large electrode adjoining area part at which the first electrode 64 and the second electrode 65 are arrayed in the proximity of each other. That is, in comparison with the rectangular array pattern in which the rectangular first electrode 64 and the rectangular second electrode 65 are distanced from each other, the staggered comb-teeth array pattern illustrated in FIG. 20 offers a larger electric-field application area, that is, an area at which an electric field can be applied. Because of such a larger electric-field application area, it is easier to cause a change in the orientation of liquid crystal molecules. Accordingly, the amount of change ΔVA in the gate electric potential VA of the amplification transistor 62 increases as the amount of change ΔClc in the capacitance value of the touch detection capacitance element Cl from a non-contact state in which the detection-target object is not in contact with the surface of the screen to a contact state in which the detection-target object is in contact with the surface of the screen increases. As the amount of change ΔVA in the gate electric potential VA of the amplification transistor 62 increases, so does the detection sensitivity of the sensing circuit 60. As illustrated in FIG. 20, the first electrode 64 of the sensing circuit 60 and the common electrode 55 of the pixel circuit P are formed out of the same layer as defined above. In addition, the second electrode 65 of the sensing circuit 60 and the pixel electrode 53 of the pixel circuit P are formed out of the same layer as defined above. Therefore, it is possible to manufacture the sensing circuit 60 and the pixel circuit P in the same manufacturing process at the same time, which makes it easier to manufacture a liquid crystal panel.

In the foregoing description of the configuration of the sensing circuit 60 according to the fifth variation example of the invention, as illustrated in FIG. 20, it is explained that the first electrode 64 and the second electrode 65 are arrayed in such an array pattern that they do not overlap each other at all when viewed in plan. However, the scope of this aspect of the invention is not limited to such an exemplary configuration. For example, the first electrode 64 and the second electrode 65 may be arrayed so as to partially overlap each other when viewed in plan. However, in order to ensure that the area of electrodes that constitute the capacitance Clm is sufficiently small, it is necessary that the area of the overlapping part at which the first electrode 64 and the second electrode 65 partially overlap each other when viewed in plan should be smaller than the area of the non-overlapping part at which the first electrode 64 and the second electrode 65 do not overlap each other when viewed in plan.

Sixth Variation Example

In the foregoing description of the configuration of the sensing circuit 60 according to the fifth variation example of the invention as well as according to the first embodiment of the invention, it is explained that the teeth of the first-electrode comb and the teeth of the second-electrode comb are staggered as if they were in engagement with each other or filled gaps each other. However, the scope of this aspect of the invention is not limited to such an exemplary configuration. For example, the first electrode 64 may have a shape of teeth of a comb whereas the second electrode 65 may have a rectangular shape with these electrodes 64 and 65 being arrayed in engagement with each other. Or, as another modification example, both of these electrodes 64 and 65 may be rectangular in shape.

E: Electronic Apparatuses

Figure 22:
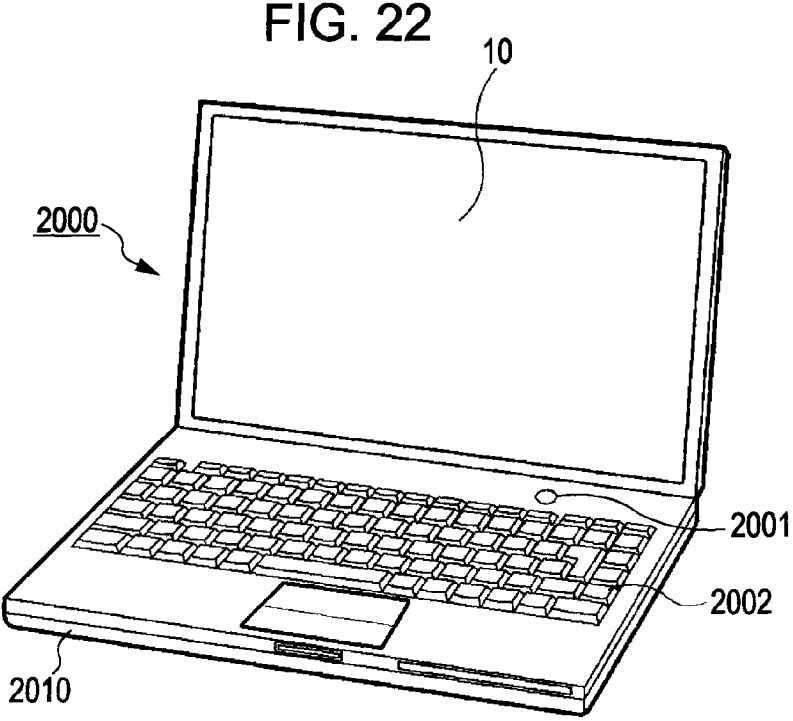
FIG. 22 is a perspective view that schematically illustrates an example of the configuration of a mobile personal computer to which an electro-optical device according to an exemplary embodiment of the invention or according to a variation example of the invention is applied.
Figure 23:
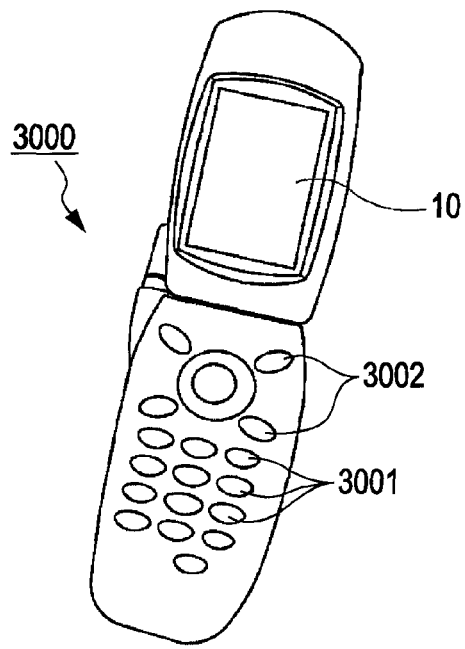
FIG. 23 is a perspective view that schematically illustrates an example of the configuration of a mobile phone to which an electro-optical device according to an exemplary embodiment of the invention or according to a variation example of the invention is applied.
Figure 24:
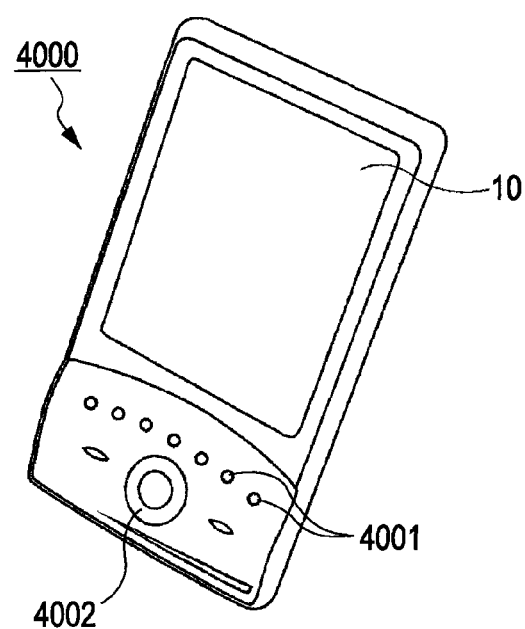
FIG. 24 is a perspective view that schematically illustrates an example of the configuration of a personal digital assistant to which an electro-optical device according to an exemplary embodiment of the invention or according to a variation example of the invention is applied.

Next, an explanation is given below of a few examples of an electronic apparatus to which the electro-optical device 10 according to any of the foregoing exemplary embodiments of the invention or according to any of the variation examples of the invention is applied. FIG. 22 is a perspective view that schematically illustrates an example of the configuration of a mobile personal computer to which the electro-optical device 10 according to any of the foregoing exemplary embodiments of the invention or according to any of the variation examples of the invention is applied. A personal computer 2000 includes the electro-optical device 10 and a main assembly 2010. The main assembly 2010 is provided with a power switch 2001 and a keyboard 2002. FIG. 23 is a perspective view that schematically illustrates an example of the configuration of a mobile phone to which the electro-optical device 10 according to any of the foregoing exemplary embodiments of the invention or according to any of the variation examples of the invention is applied. A mobile phone 3000 is provided with the electro-optical device 10, a plurality of manual operation buttons 3001, and scroll buttons 3002. As a user manipulates the scroll buttons 3002, content displayed on the screen of the electro-optical device 10 is scrolled. FIG. 24 is a perspective view that schematically illustrates an example of the configuration of a personal digital assistant (PDA) to which the electro-optical device 10 according to any of the foregoing exemplary embodiments of the invention or according to any of the variation examples of the invention is applied. A personal digital assistant 4000 is provided with the electro-optical device 10, a plurality of manual operation buttons 4001, and a power switch 4002. As a user manipulates the manual operation buttons 4001, various kinds of information including but not limited to an address list or a schedule table is displayed on the electro-optical device 10. Among a variety of electronic apparatuses to which the electro-optical device according to an aspect of the present invention is applicable are, other than the specific examples illustrated in FIGS. 22-24, a digital still camera, a car navigation device, a television, a video camera, an electronic personal organizer, an electronic paper, a word processor, a workstation, a POS terminal, a printer, a scanner, a copier, an automatic vending machine, and so forth.

The entire disclosure of Japanese Patent Application No. 2008-129300, filed May 16, 2008 is expressly incorporated by reference herein.

What is claimed is:

1. An electro-optical device comprising:
a screen on which an image is displayed;
a first substrate and a second substrate that are provided opposite to each other;
liquid crystal that is sandwiched between the first substrate and the second substrate;
an electrostatic capacity detecting section that outputs a detection signal whose level corresponds to the value of a capacitance that is formed by the liquid crystal, a first electrode, and a second electrode, wherein both of the first electrode and the second electrode are provided on a surface of the first substrate that faces the second substrate;
an image displaying section that includes the liquid crystal, a third electrode, and a fourth electrode, the image displaying section controlling the transmission factor of the liquid crystal for displaying an image on the screen;
a driving section that supplies an electric potential to the third electrode and supplies an electric potential to the fourth electrode so as to control the state of alignment of the liquid crystal, the driving section switching over the driving state of the liquid crystal at a predetermined cycle between a first driving state in which a first fixed potential is applied to the third electrode whereas a data potential that is in accordance with gradation to be displayed is applied to the fourth electrode and a second driving state in which a second fixed potential is applied to the third electrode whereas the data potential is applied to the fourth electrode;
a first memorizing section that memorizes the level of the detection signal outputted by the electrostatic capacity detecting section in a state in which a detection target object is not in contact with the screen as reference data;
a second memorizing section that memorizes the level of the detection signal outputted by the electrostatic capacity detecting section in a state in which a judgment is made as to whether the screen is contacted or not as detection target data;
a controlling section that controls the operation of writing into the first memorizing section and the second memorizing section and the operation of reading out of the first memorizing section and the second memorizing section so as to ensure that the driving state of the liquid crystal corresponding to the reference data that is read out of the first memorizing section should be the same as the driving state of the liquid crystal corresponding to the detection target data that is read out of the second memorizing section;
a difference data generating section that generates a difference between the reference data that has been read out of the first memorizing section and the detection target data that has been read out of the second memorizing section as difference data; and
a judging section that judges whether the detection target object is in contact with the screen or not on the basis of the difference data.

2. The electro-optical device according to claim 1, wherein the controlling section causes the first memorizing section to memorize the reference data detected in the first driving state and the reference data detected in the second driving state; the controlling section causes the second memorizing section to memorize the detection target data detected in either one of the first driving state and the second driving state; the controlling section reads the detection target data detected in the either one of the first driving state and the second driving state out of the second memorizing section and then supplies the readout detection target data to the difference data generating section; and the controlling section reads the reference data corresponding to the either one of the first driving state and the second driving state out of the first memorizing section and then supplies the readout reference data to the difference data generating section.

3. The electro-optical device according to claim 1, wherein the controlling section causes the first memorizing section to memorize the reference data detected in either one of the first driving state and the second driving state; and the controlling section causes the second memorizing section to memorize the detection target data detected in the either one of the first driving state and the second driving state.

4. The electro-optical device according to claim 1, further comprising:
a calculating section that calculates an average of the level of the detection signal outputted by the electrostatic capacity detecting section in the first driving state and the level of the detection signal outputted by the electrostatic capacity detecting section in the second driving state as average data,
wherein the first memorizing section memorizes the average data calculated in a state in which a detection target object is not in contact with the screen as the reference data whereas the second memorizing section memorizes the average data calculated in a state in which a judgment is made as to whether the screen is contacted or not as the detection target data.

5. The electro-optical device according to claim 4, wherein the calculating section calculates the average data with the use of the detection signal outputted by the electrostatic capacity detecting section in one of two time periods that are adjacent to each other in time series in the predetermined cycle and further with the use of the detection signal outputted by the electrostatic capacity detecting section in the other of the two adjacent time periods.

6. The electro-optical device according to claim 1, wherein the driving section switches over the driving state of the liquid crystal between the first driving state and the second driving state periodically; and the periodic switchover is performed at the predetermined cycle corresponding to a natural-number multiple of a frame period or a field period.

7. An electronic apparatus that is provided with the electro-optical device according to claim 1.

8. A contact detection method that is used by an electro-optical device that includes a screen on which an image is displayed, a first substrate and a second substrate that are provided opposite to each other, liquid crystal that is sandwiched between the first substrate and the second substrate, an electrostatic capacity detecting section that outputs a detection signal whose level corresponds to the value of a capacitance that is formed by the liquid crystal, a first electrode, and a second electrode, and an image displaying section that includes the liquid crystal, a third electrode, and a fourth electrode and controls the transmission factor of the liquid crystal for displaying an image on the screen, a driving section that supplies an electric potential to the third electrode and supplies an electric potential to the fourth electrode so as to control the state of alignment of the liquid crystal, the driving section switching over the driving state of the liquid crystal at a predetermined cycle between a first driving state in which a first fixed potential is applied to the third electrode whereas a data potential that is in accordance with gradation to be displayed is applied to the fourth electrode and a second driving state in which a second fixed potential is applied to the third electrode whereas the data potential is applied to the fourth electrode, a controlling section that controls the operation of writing into a first memorizing section and a second memorizing section and the operation of reading out of the first memorizing section and the second memorizing section so as to ensure that the driving state of the liquid crystal corresponding to the reference data that is read out of the first memorizing section should be the same as the driving state of the liquid crystal corresponding to the detection target data that is read out of the second memorizing section, the contact detection method enabling the contact of a detection target object and the screen to be detected with the use of the electrostatic capacity detecting section, the contact detection method comprising:
providing both of the first electrode and the second electrode on a surface of the first substrate that faces the second substrate;
memorizing the level of the detection signal in a state in which the detection target object is not in contact with the screen as reference data;
memorizing the level of the detection signal in a state in which a judgment is made as to whether the screen is contacted or not as detection target data;
generating a difference between the reference data and the detection target data as difference data; and
judging whether the detection target object is in contact with the screen or not on the basis of the difference data.

9. A contact detection method that is used by an electro-optical device that includes a screen on which an image is displayed, a first substrate and a second substrate that are provided opposite to each other, liquid crystal that is sandwiched between the first substrate and the second substrate, an electrostatic capacity detecting section that outputs a detection signal whose level corresponds to the value of a capacitance that is formed by the liquid crystal, a first electrode, and a second electrode, an image displaying section that includes the liquid crystal, a third electrode, and a fourth electrode and controls the transmission factor of the liquid crystal for displaying an image on the screen, and a driving section that supplies an electric potential to the third electrode and supplies an electric potential to the fourth electrode so as to control the state of alignment of the liquid crystal, the driving section switching over the driving state of the liquid crystal at a predetermined cycle between a first driving state in which a first fixed potential is applied to the third electrode whereas a data potential that is in accordance with gradation to be displayed is applied to the fourth electrode and a second driving state in which a second fixed potential is applied to the third electrode whereas the data potential is applied to the fourth electrode, and a controlling section that controls the operation of writing into a first memorizing section and a second memorizing section and the operation of reading out of the first memorizing section and the second memorizing section so as to ensure that the driving state of the liquid crystal corresponding to the reference data that is read out of the first memorizing section should be the same as the driving state of the liquid crystal corresponding to the detection target data that is read out of the second memorizing section, the contact detection method enabling the contact of a detection target object and the screen to be detected with the use of the electrostatic capacity detecting section, the contact detection method comprising:

providing both of the first electrode and the second electrode on a surface of the first substrate that faces the second substrate;

acquiring the level of the detection signal in a state in which the detection target object is not in contact with the screen as reference data and memorizing the reference data acquired in the first driving state and the reference data acquired in the second driving state;

acquiring the level of the detection signal in a state in which a judgment is made as to whether the screen is contacted or not as detection target data and memorizing the acquired detection target data in either one of the first driving state and the second driving state;

reading the detection target data acquired in the either one of the first driving state and the second driving state and reading the reference data corresponding to the either one of the first driving state and the second driving state so as to generate a difference between the readout reference data and the readout detection target data as difference data; and judging whether the detection target object is in contact with the screen or not on the basis of the difference data.

10. The electro-optical device according to claim 1, wherein the electrostatic capacity detecting section directly detects the capacitance formed by the liquid crystal, the first electrode, and the second electrode.

\* \* \* \* \*